(12) United States Patent
Sherman et al.

(10) Patent No.: US 9,538,011 B1
(45) Date of Patent: Jan. 3, 2017

(54) MOBILE MICROPHONE SYSTEM PORTAL APP FOR MEETINGS

(71) Applicant: Kenneth Nathaniel Sherman, Santa Barbara, CA (US)

(72) Inventors: Kenneth Nathaniel Sherman, Santa Barbara, CA (US); Andrew Livingston, Palo Alto, CA (US)

(*) Notice: Subject to any disclaimer, the term of this patent is extended or adjusted under 35 U.S.C. 154(b) by 200 days.

(21) Appl. No.: 14/218,856

(22) Filed: Mar. 18, 2014

Related U.S. Application Data

(63) Continuation-in-part of application No. 13/844,412, filed on Mar. 15, 2013, now Pat. No. 9,232,307, which is a continuation-in-part of application No. 13/430,618, filed on Mar. 26, 2012, now Pat. No. 8,452,026, which is a continuation-in-part of application No. 12/220,791, filed on Jul. 28, 2008, now Pat. No. 8,144,893.

(60) Provisional application No. 60/962,067, filed on Jul. 26, 2007, provisional application No. 61/799,318, filed on Mar. 15, 2013.

(51) Int. Cl.
| | |
|---|---|
| H04M 1/60 | (2006.01) |
| H04M 3/56 | (2006.01) |
| H04R 27/00 | (2006.01) |
| H04L 29/06 | (2006.01) |
| H04R 5/04 | (2006.01) |
| H04W 84/12 | (2009.01) |

(52) U.S. Cl.
CPC ............ *H04M 3/568* (2013.01); *H04L 65/403* (2013.01); *H04R 5/04* (2013.01); *H04R 27/00* (2013.01); *H04M 1/6033* (2013.01); *H04M 1/6066* (2013.01); *H04R 2420/07* (2013.01); *H04W 84/12* (2013.01)

(58) Field of Classification Search
CPC .............. H04M 1/6066; H04M 1/6033; H04M 1/72544; H04M 2250/06; H04M 1/604; H04R 2420/07; H04R 5/04; H04W 88/02
See application file for complete search history.

(56) References Cited

U.S. PATENT DOCUMENTS

| | | | |
|---|---|---|---|
| 8,538,383 B2 | 9/2013 | Moosavi | |
| 2001/0042002 A1* | 11/2001 | Koopersmith | G06Q 30/02 705/26.3 |
| 2004/0207719 A1* | 10/2004 | Tervo | H04M 1/7253 348/14.02 |
| 2008/0070516 A1* | 3/2008 | Lee | H04R 5/04 455/90.1 |
| 2010/0177667 A1* | 7/2010 | Simmons | H04M 1/2535 370/260 |

* cited by examiner

*Primary Examiner* — Raj Jain
(74) *Attorney, Agent, or Firm* — Aka Chan LLP

(57) ABSTRACT

An app for programmable personal mobile communications devices which is useful for people attending meetings, conferences, classrooms and the like is described. The app permits the device to operate as a microphone to address the audience through a local wireless network and the public address system and as an app for meeting functions, such as the queuing of speaker/questioners at the meeting, the handling of audience surveys and nondisclosure agreements, record-keeping at meetings and so forth. Furthermore, different aspects of the app allow a user to operate as a moderator/host of a meeting in one case or as an attendee/participant of the meeting in another.

24 Claims, 48 Drawing Sheets

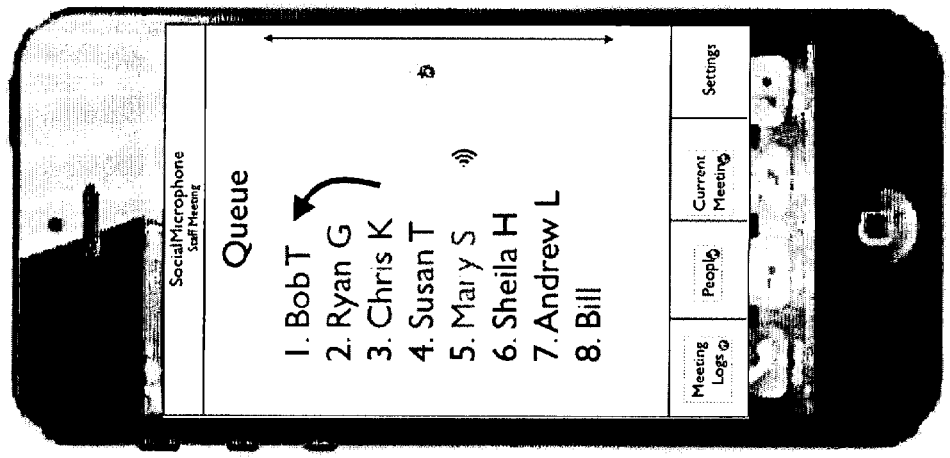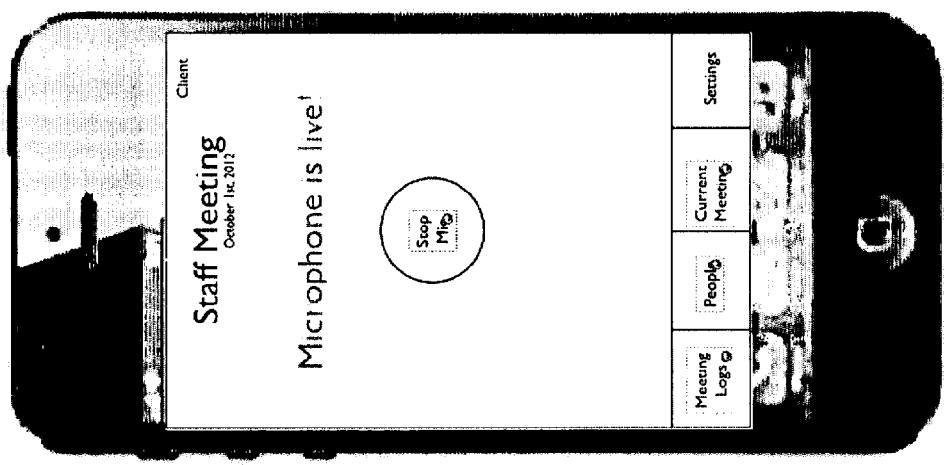
FIG. 3

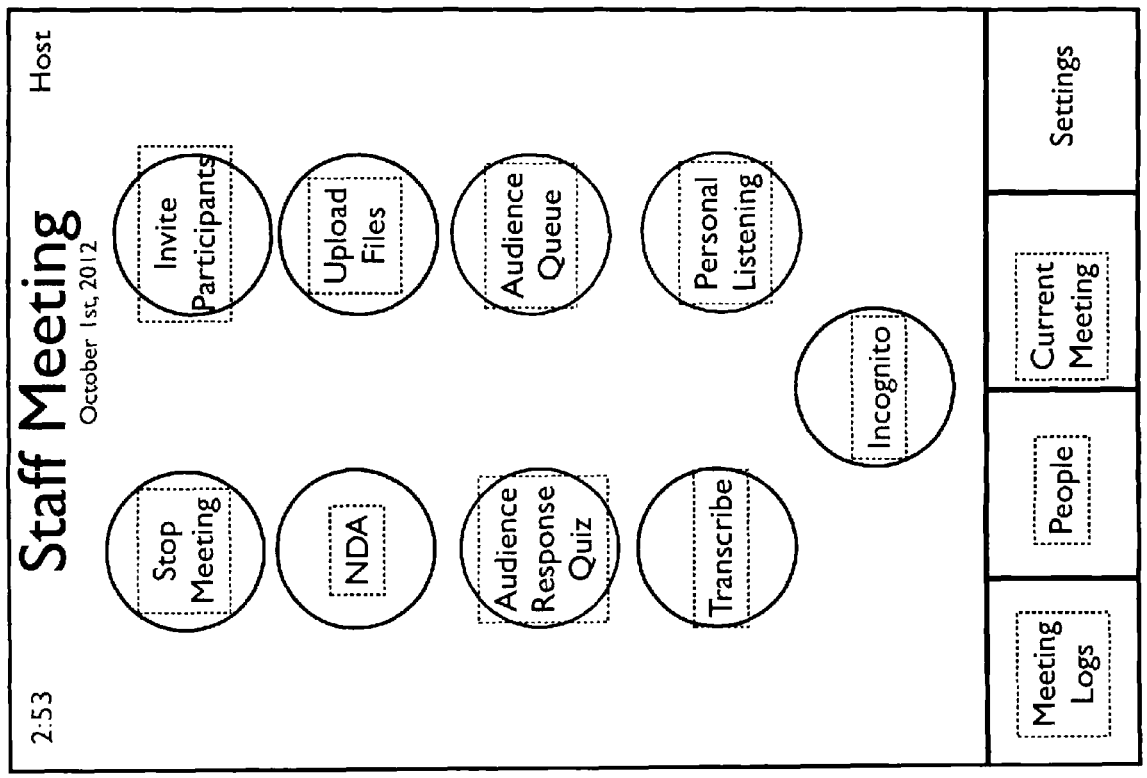

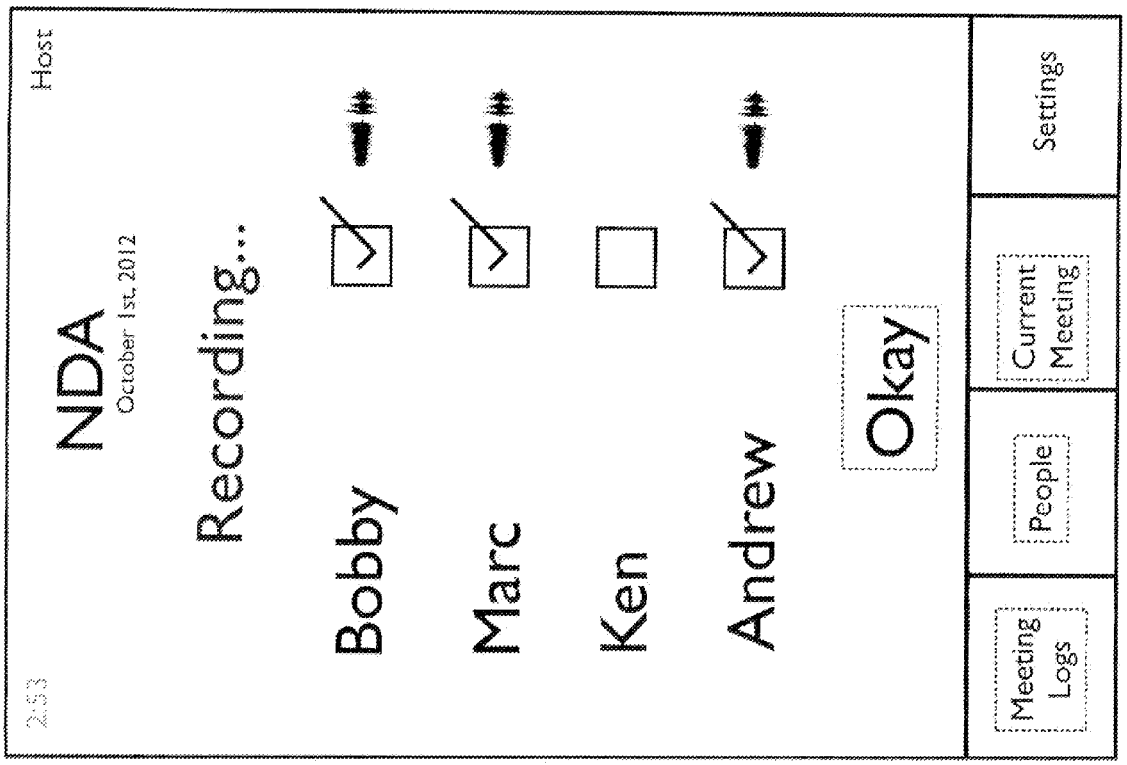

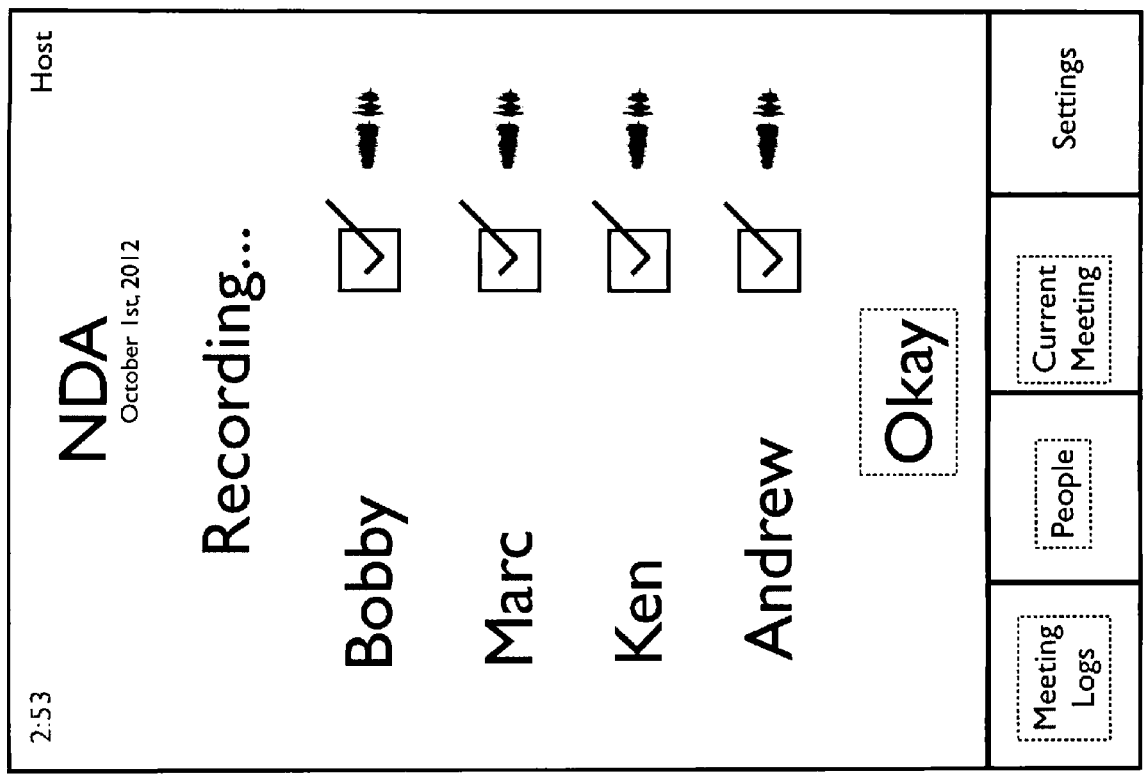

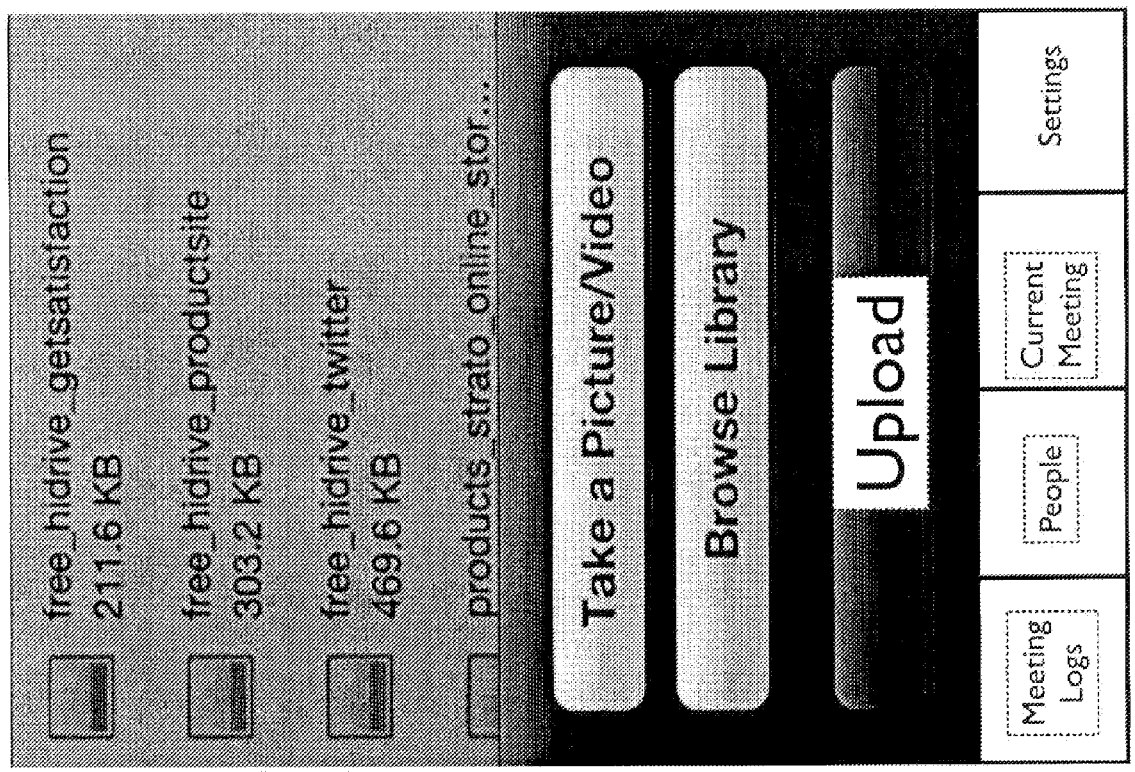

FIG. 14A

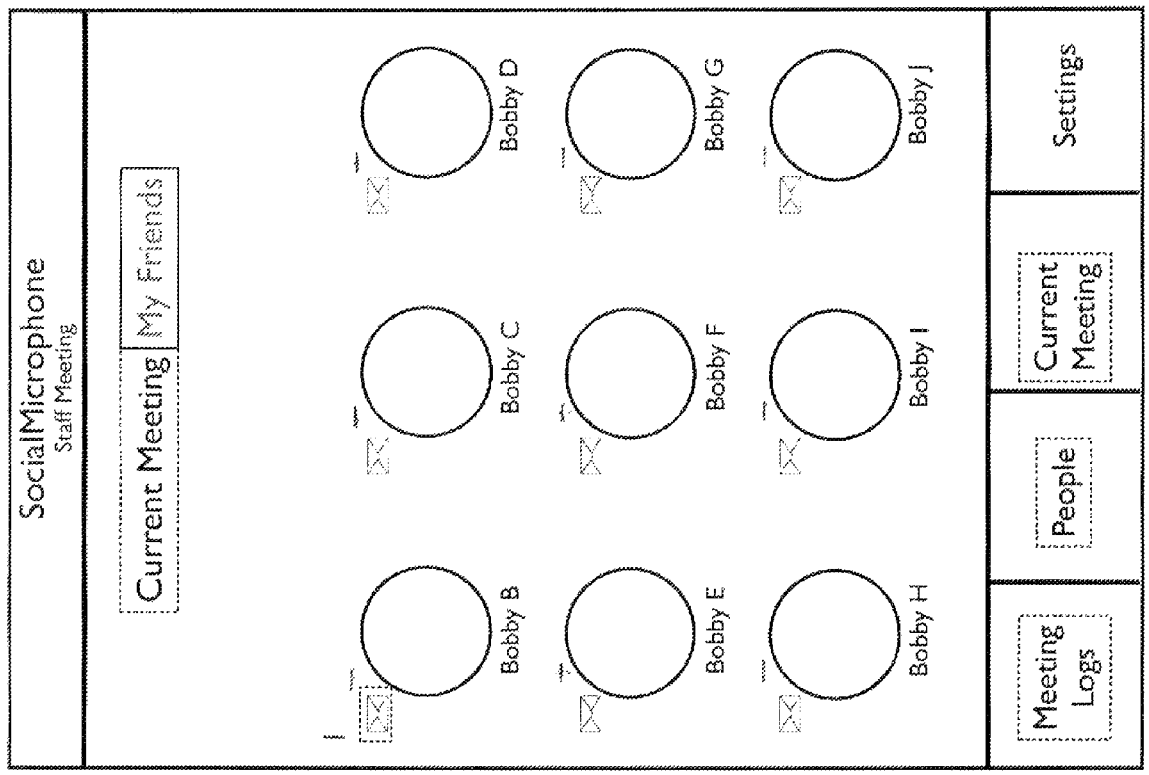

FIG. 20A

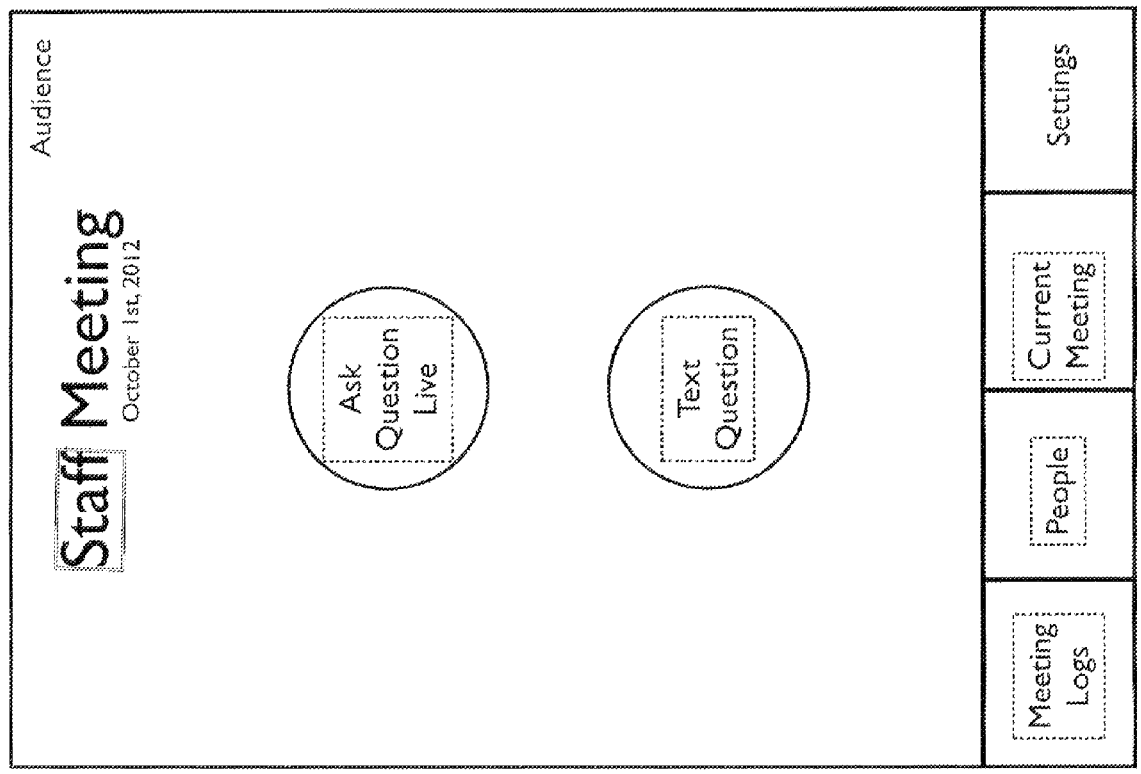

FIG. 41B

SocialMicrophone — Staff Meeting
Audience

Great! You're 7th up.

Your question will be read by the moderator when it's your turn!

Okay

Meeting Logs | People | Current Meeting | Settings

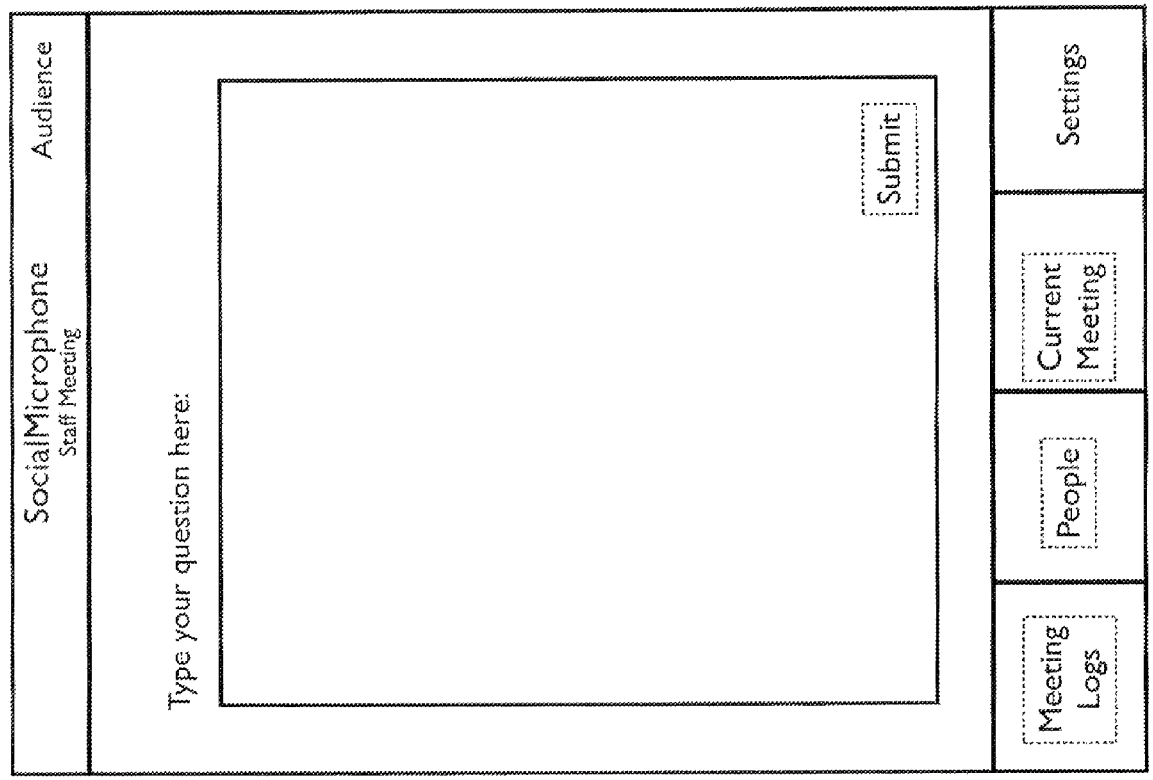

FIG. 23

Join Session
Sessions around you:

Audience

Back

+ Create New Session

Ribosome Research
Tuesday, May 22nd, 2012
14 days ago

The French Revolution
Tuesday, May 22nd, 2012
14 days ago

WWDC
Tuesday, May 22nd, 2012
14 days ago

Foreign Policy
Tuesday, May 22nd, 2012
14 days ago

Healthcare
Tuesday, May 22nd, 2012
14 days ago

Tailors of America
Tuesday, May 22nd, 2012
14 days ago

Meeting Logs | People | Current Meeting | Settings

FIG. 25

Staff Meeting
October 1st, 2012

2:53    Audience

Non-disclosure Agreement

This Nondisclosure Agreement ("Agreement") is made as of Date _____ between Company Name Inc. ("Company"), and Person Name, of Company Name, www.URL.com ("Confidant").

RECITALS

WHEREAS, Company and Confidant are agreeing to the pursuit of the business purpose of [business purpose] for the Company.

WHEREAS, Company is willing to disclose Confidential Information to Confidant in strict accordance with the terms of Agreement for the sole purpose of Confidant assessing the Business Purpose.

NOW, THEREFORE, for good and valuable consideration, receipt of which is hereby acknowledged, and the mutual agreements set forth herein, each party agrees as follows.

Confidential Information. As used in Agreement, "Confidential Information" means any information not readily available to the public, and includes not only technical information but also business information, disclosed, either orally or in writing, by Company to Confidant. Without limiting the generality of the foregoing, Confidential Information includes business strategies, technology, concepts, experimental data, product design, research and development data and agreements, formulae, materials, marketing data and plans and financial data, and any intellectual property therein or related thereto. Confidential Information is a special, valuable and unique asset of Company.

Exclusions. Confidential Information does not include information that Confidant can demonstrate: a. Is now, or hereafter becomes, through no act or failure to act on the part of Confidant, generally known or available to the public; b. Was rightfully known by Confidant before receiving such information from Company without breach of any confidence herein; or c. Is hereafter rightfully obtained by Confidant from a third party, without breach of any obligation to Company.

Obligations. Confidant agrees:

a. To hold Confidential Information in strict confidence for a period of five years from date of signature;

b. Not to disclose such Confidential Information to any third party, except as specifically authorized herein or as specifically authorized by Company in writing;

c. To use all reasonable precautions, consistent with Confidant's treatment of its own You have signed this.

Meeting Logs | People | Current Meeting | Settings

FIG. 27

Invite Participants

Search

Andrew Livingston
amliving@gmail.com

Ken Sherman
ken@gmail.com

Peter Welks
peter@gmail.com

Ingrid Perts
ingrid@gmail.com

Anne Karen
annek@gmail.com

Jean Pierre Leaud
jpleaud@gmail.com

Francois Truffaut
truffaut@gmail.com

Meeting Logs | People | Current Meeting | Settings

FIG. 28B

MOBILE MICROPHONE SYSTEM PORTAL APP FOR MEETINGS

CROSS-REFERENCE TO RELATED APPLICATIONS

This patent application is a continuation-in-part patent application of U.S. application Ser. No. 13/844,412, filed Mar. 15, 2013, which is itself a continuation-in-part application of U.S. application Ser. No. 13/430,618, filed Mar. 26, 2012, which is itself a continuation-in-part application of U.S. application Ser. No. 12/220,791, filed Jul. 28, 2008, and which issued as U.S. Pat. No. 8,144,893 on Mar. 27, 2012, which in turn claims priority from U.S. Provisional Patent Application No. 60/962,067, filed Jul. 26, 2007, and having the title, MASH-UP OF PHYSICAL SPACE AND CYBER-SPACE; and claims priority from U.S. Provisional Patent Application No. 61/799,318, filed Mar. 15, 2013 by Kenneth N. Sherman and Andrew Livingston, and entitled, "Portal App for Meetings."

BACKGROUND OF THE INVENTION

The present invention relates to the fields of communications, particularly closed environment communication, local conferencing and the use of existing voice and data messaging systems in these fields of communication.

In meetings, conferences, classrooms and the like, a typical question-and-answer period allows attendees and participants to ask questions from the floor. In a large venue without amplification, others in the room often have trouble hearing the speaker. Commonly, a microphone is provided in one or more aisles or a portable microphone is passed to a person wishing to ask a question. This can force people to maneuver their seating towards the aisles where microphone access might be more easily available, or cause some significant and disturbing activity in audiences and lead to disruption of the underlying meeting. The movement of the microphones through the audience can be tedious, slow (e.g., from one extreme corner of a room to another) and cumbersome. There can also be such significant jousting for attention as to be disconcerting to participants and lead to a loss of audience control. The current system also may not work because a microphone is not available, does not work well, or there is no portable microphone handy near the participant who wishes to speak. Often, the participant speaker doesn't properly use a microphone—waving it about or placing it too far away from his or her mouth while speaking—thus negating the advantages of the microphone.

To address these issues, U.S. patent application Ser. No. 13/844,412, filed Mar. 15, 2013 by Kenneth N. Sherman and Andrew Livingston, and entitled, "Mobile Microphone System and Method," (which is herein incorporated by reference) and related patent applications (including U.S. Pat. Nos. 8,144,893 and 8,452,026) describe ways in which personal mobile communications devices, including smartphones, such as the Apple iPhone, Samsung Galaxy, and the like, cellular telephones, PDA's (Personal Digital Assistants), electronic tablets, such as the Apple iPad, the ASUS Nexus 7 and the like with mobile communication applications, WiFi and Bluetooth laptop processors (PC and Mac), and other hand-sized, computer-based communication devices, can be especially used at large meetings, gatherings, conferences, etc. as microphones. Wireless telephone networks and local wireless networks are used with the personal mobile communications devices of the attendees and participants of the meeting.

Programmable personal mobile communications devices, such as smartphones, can be adapted as microphones by applications, sometimes termed "apps." The present invention describes apps by which programmable personal mobile communications devices, such as a smartphone, can also be used into a portal for many other functions which are useful for meetings and the like, besides that of microphone. Such meeting functions allow for the easy management and operation of meetings and gatherings by the moderator/host and the straightforward participation and attendance by audience members for an enhanced experience.

BRIEF SUMMARY OF THE INVENTION

The present invention provides for a method of operating a programmable personal mobile communications device at a meeting having a local wireless network connected to an amplified audio system. The method has the steps: processing a speaker's voice into an electronic signal inside the user's personal mobile communications device, transmitting the electronic signal as data via a local wireless network signal to a receiving device connected to the amplified audio system or to another personal mobile communications device connected to the amplified audio system and broadcasting the output of amplified audio system to the meeting; and receiving information inviting a response, such as a questionnaire, over the local wireless network and transmitting a user questionnaire response back over the local wireless network so that both microphone functions and meeting functions are integrated in the programmable personal mobile communications device. Additionally, transmitting data independent of the audio signal to and from programmable personal mobile communications devices and receiving devices in the meeting room to permit functions that support and manage questions, comments and answers over conventional microphones. The processing and transmitting step can be performed so that the amplifier audio system transmits voice signals from the user to the meeting at the time voice signals are received from the user for processing (synchronously); or so that the amplifier audio system transmits voice signals from the user to the meeting at a time different from the time voice signals are received from the user for processing (asynchronously). Further steps include: receiving local wireless network signals corresponding to processed voice signals of other users of personal mobile communications devices at the meeting; receiving local wireless network signals corresponding to transcriptions of other meetings; sending and receiving local wireless network signals corresponding to a non-disclosure agreement for the meeting and attendee signatures on such agreements.

The present invention also provides for a method of operating a programmable personal mobile communications device at a meeting having a local wireless network connected to an amplified audio system. The method has the steps: a device and/or a programmable personal mobile communications device receiving voice signals from a user of a personal mobile communications device, the voice signals processed into local wireless network signals, processing the local wireless network signals into voice signals and transmitting the voice signals over the amplified audio system to the meeting; and transmitting an audience response question or questionnaire over the local wireless network and receiving a user response or questionnaire response back over the local wireless network so that microphone functions and meeting functions are integrated in the programmable personal mobile communications device. The receiving, processing and transmitting step can be performed so that the amplifier audio system transmits voice signals over the amplified audio system to the meeting at the time processed voice signals are received from the user of the second personal mobile communications device; or so that the amplifier audio system transmits voice signals over the amplifier audio system to the meeting at a time different from the time processed voice signals are received from the user of the second personal mobile communications device. Further steps include: transmitting local wireless network signals corresponding to processed voice signals of other users of personal mobile communications devices at the meeting; transmitting local wireless network signals corresponding to transcriptions of other meetings; and transmitting local wireless network signals corresponding to a non-disclosure agreement for the meeting.

The invention provides also for an app with two faces: One face that is used by the meeting attendee, or user, the other face that is used by the manager of the meeting such as the speaker, moderator or meeting organizer. Thus, under controlled circumstances, any person with the app can play the role of an attendee or a moderator without needing to download another app.

The invention provides for meeting leaders, such as the aforementioned speakers, moderators, and meeting organizers, who have access to the meeting manager side of the app to create, and modify in real time, a queue that determines the order of the questions and comments based on information about the attendees and what they wish to say.

The invention provides for attendees to see the Profile of the person currently talking.

The invention also provides for the app to act as a memory device, or portal, for the owner of the app to retrieve information about any meeting where the app was used by its owner. Such information includes, but is not limited to, presentation materials, such as PowerPoints, graphics, photos, and videos, cited URLs, attendee lists, meeting descriptions, and abstracts, sponsor information, audio and written transcripts, and translations.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 shows some exemplary screens on smartphones operating with the portal app.

FIG. 11 shows the wireframe screen after the moderator/host has invoked the Incognito mode.

FIG. 13 shows a screen when the Upload Files icon of FIG. 9 (or 10A) is invoked.

FIG. 15D illustrates the situation when a personal message is received from a person on the contact list.

FIG. 16A shows a screen of prospective speakers/questioners at the current session in a queue after moderator/host has clicked on the Audience Queue icon from the FIG. 9 (10) screen.

FIG. 20A shows the list of meetings the moderator/host has attended by clicking on the Meeting Logs icon on the bottom screen bar; FIG. 20B shows the screen when a particular meeting has been clicked on.

FIG. 21A shows a screen when the attendee/participant has clicked upon the Ask Question icon of FIG. 16; FIG. 21B shows a screen after the attendee/participant has clicked upon the Ask Question Live icon in FIG. 21A and where he is in the queue; FIG. 21C shows the screen after the attendee/participant is about to receive the floor of the meeting and his personal mobile communications device is ready to connected to the amplifier system of the meeting;

FIG. 22 shows a screen after the attendee/participant has clicked on the Text Question icon in FIG. 21A.

FIG. 23 shows a screen of available sessions when an attendee/participant has clicked upon the Join Session icon of FIG. 5.

FIG. 25 shows an attendee/participant screen with a nondisclosure agreement for a session after the NDA icon (FIG. 16) has been clicked.

FIG. 27 shows an attendee/participant screen after the Invite Participants icon (FIG. 16) has been clicked.

FIG. 28B shows a question from a prospective speaker in the queue.

DETAILED DESCRIPTION OF THE INVENTION

Context of the Present Invention

Figure 1A:
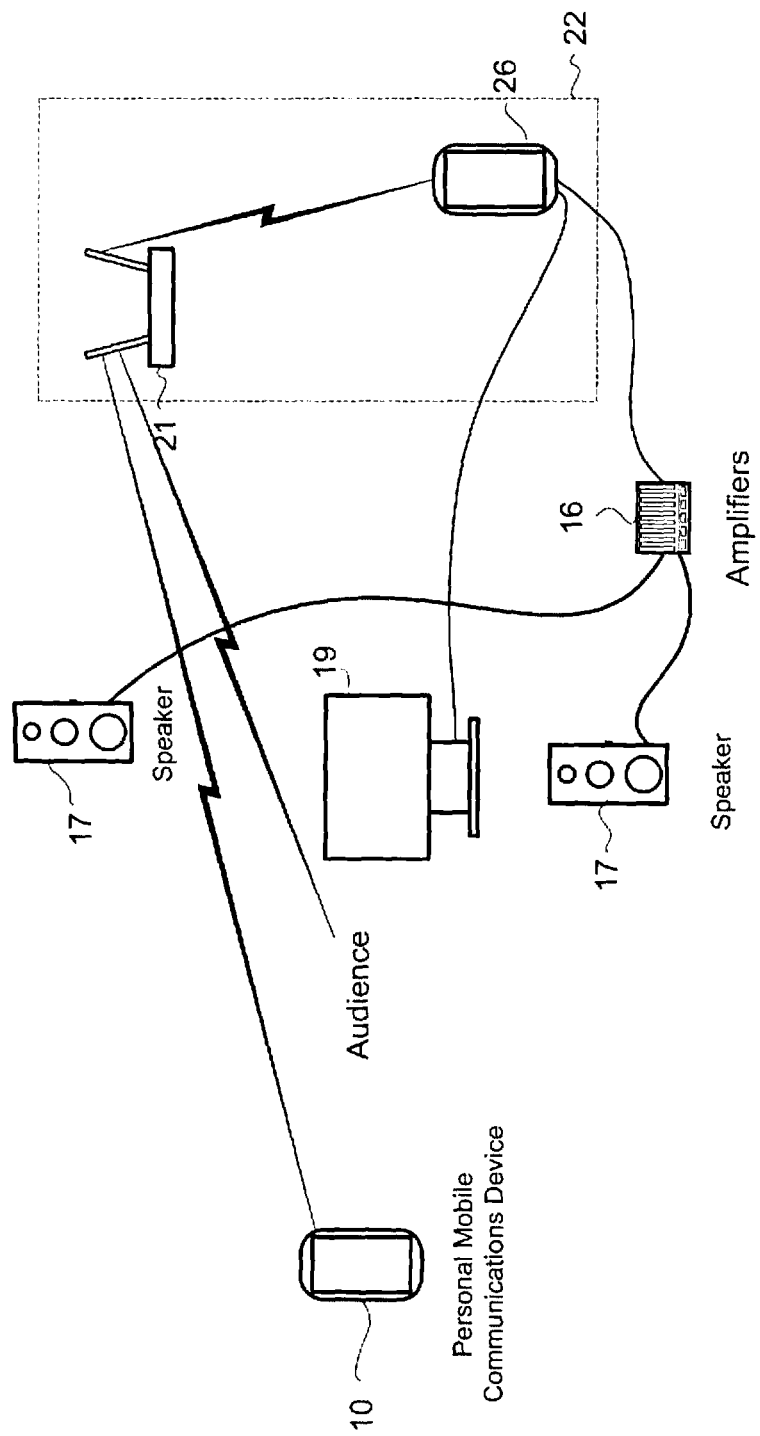
FIGS. 1A-1B show different network arrangements for personal mobile communications devices in meeting venues with amplified audio systems where the personal mobile communications devices can be used as microphones and the portal app of the present invention might be used.
Figure 1B:
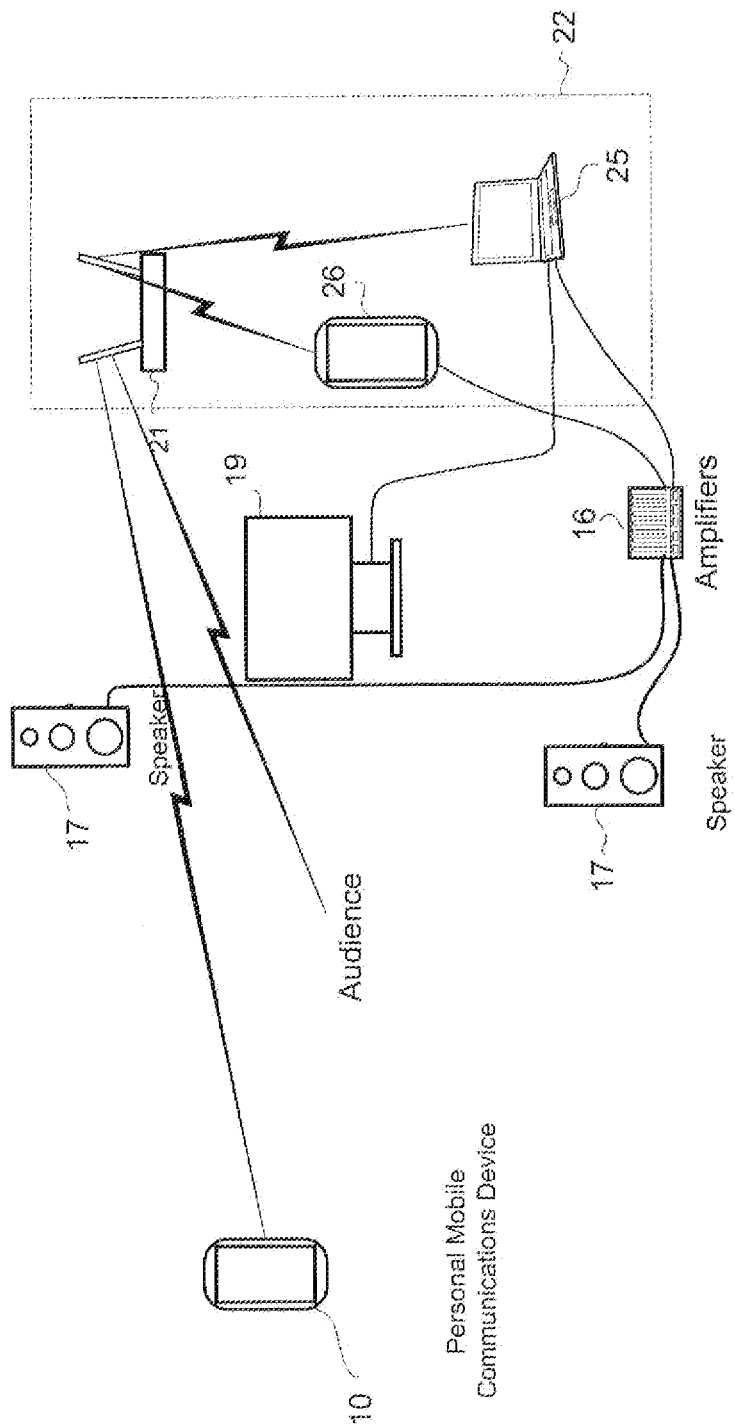

FIGS. 1A-1B are illustrative of meeting venues at which attendee/participants of such meetings and moderator/host who manage such meetings might find the present invention very useful. The drawings provide a context for the description below.

At meetings, conventions, gatherings, conferences, worship services, classrooms, and the like, an audience and/or participants is typically addressed by a public address system formed by speakers 17 and amplifiers 16 with a central microphone controlled by a host/moderator. Besides audio communication, the audience might also receive additional information through a visual display system 19. This is an ordinary audio-visual system which is typically found at meetings, gatherings, conferences, etc. today.

As described in the previously cited U.S. patent application Ser. No. 13/844,412, the personal mobile communications devices in the audience can be used as microphones at such meetings, gatherings, conferences, etc. In one arrangement illustrated by FIG. 1B the functions of a central communications point 22 is provided by a combination of a personal mobile communications device 26 and a control computer 25 which is connected to the public address system. The control computer 25 (represented by a laptop computer in FIG. 1A and a personal mobile communications device in FIG. 1B) has one or more processors, memory elements, various input/output units, such as keyboards, mice, track balls and displays (including touch-sensitive displays), and network connection units.

The attendees/participants may use their personal mobile communications devices, such as smartphones and the like, as microphones to address others in the room via the public address or sound amplification system. FIGS. 1A and 1B show that the signals may be sent by WiFi processor-based transmission to a processor system at the central communication point or by other wireless networks. The moderator or host at the central communications point (the function of which may be fully automated by a processor or with a live presenter) controls and directs the flow of information. Each electronic communication from an attendee/participant may be queued for response at the central communications point and the moderator enables at least one electronic communication transmission from an attendee/participant who has access to the central communications point to have at least part of the transmission broadcast at the meeting or allow open communication from the attendee/participant to be broadcast. The electronic communication transmission may comprise or consist of textual information, video information and/or audio information.

As shown in FIGS. 1A and 1B, the wireless information from the attendee/participant's programmable personal mobile communication device 10 is received by a wireless access point 21. A 802.11 Wi Fi Wireless Access Point is preferred, but Local Wireless Networks can be formed by Bluetooth connections, WiFi and Bluetooth mesh networks, and other communication protocols such as infrared, RF, and even combinations and/or hybrids of these technologies. The wireless access point 21, also called a router, connects the personal mobile communications device 10 to a second personal mobile communications device 26 which is connected by wire or Bluetooth to the public address system's microphone input to the amplifier system 16 and hence to the speakers 17. Or, the Wireless Access Point connects instead to a WiFi receiver that is wired through a server client relationship to the microphone input. This local wireless communications channel from one personal mobile communications device 10 to another device, either another personal mobile communications device 26 which communicates, by wire or Bluetooth to the microphone input, or to a WiFi receiver wired through a server client relationship to the microphone input, operates under the standards of IEEE 802.11. Attendee/participant audio data, i.e., the electronic audio signals, are sent using UDP (User Datagram Protocol) and the control signals are sent using TCP (Transmission Control Protocol). Personal mobile communication devices can be in many forms, for example, smartphones, PDA's (Personal Digital Assistants), electronic tablets, such as the Apple iPad, the ASUS Nexus, the Samsung Galaxy and other devices, which are equipped with WiFi radio.

Figure 2:
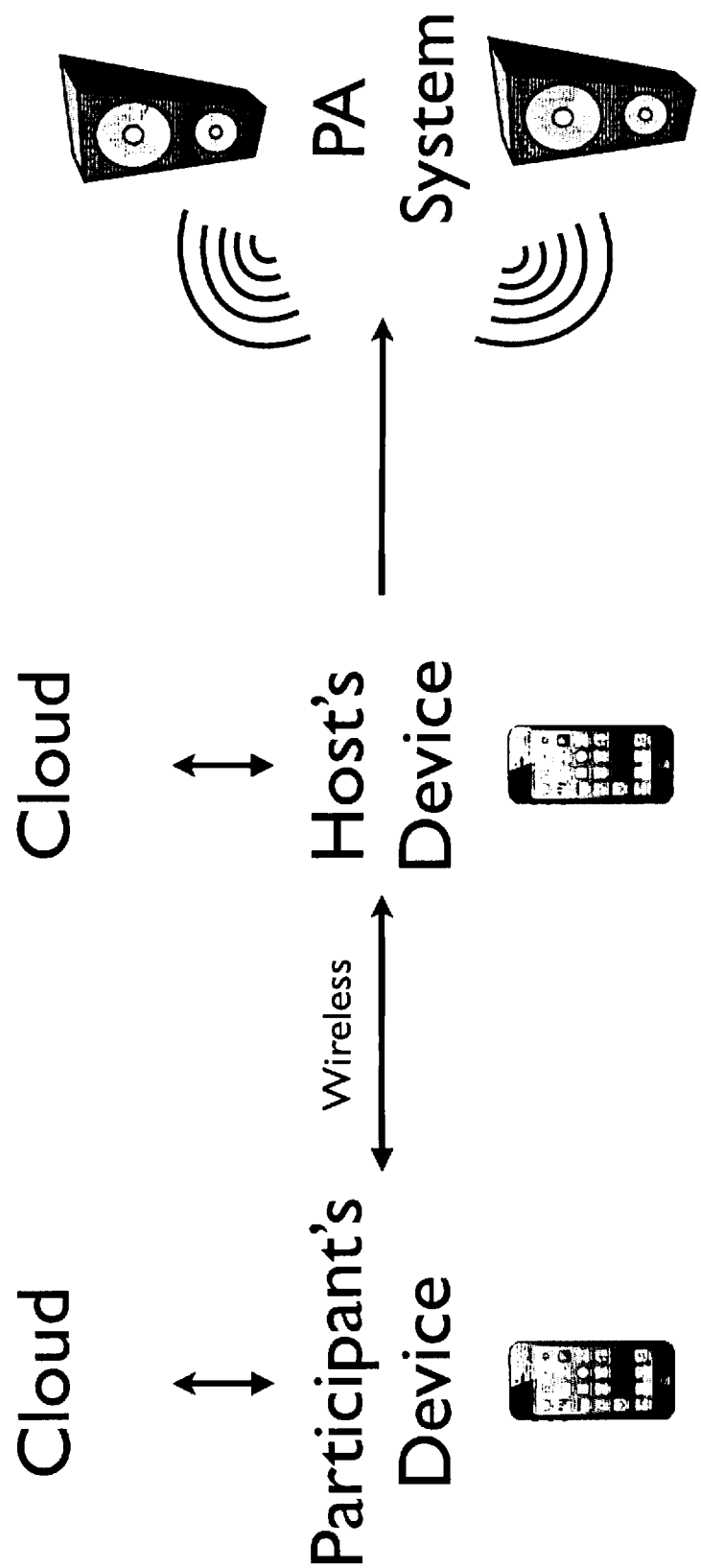
FIG. 2 shows a generalized network connection for the programmable personal mobile communications device operating with the portal app of the present invention.

FIGS. 1A and 1B illustrate some of the arrangements by which personal mobile communications devices may be connected and used by meeting attendee/participants and moderator/hosts. Other arrangements are also possible. For example, in the drawings the moderator/host personal mobile communications device 26 is connected by wire to the audio amplifier system and to the visual display system 19 (FIG. 1B) and wireless connections could be utilized instead. Furthermore, it should be understood that the illustrated arrangements do not show optional wider network connections, such as to the Internet, for purposes of simplicity. Another general view of connectivity is illustrated in FIG. 2 where the programmable personal mobile communications devices of the attendee/participants and the moderator/host are not only in communicative connection with the meeting audio amplifier system, but they are also in communication to other network locations, such as one or more servers in the "cloud."

To allow the personal mobile communications devices of the attendee/participants and moderator/host to operate as described above, software in the form of an "app" are installed in the devices. For example, an app in the smartphone 10 allows an attendee/participant to communicate with the same app in the other smartphone 26 (the moderator's) through the wireless access point 21. With connection to the public address system, i.e., the amplifiers 16 and speakers 17, the app permits the smartphone 10 to function as a microphone for the attendee/participant caller. Since smartphones are nearly ubiquitous in modern society, the personal mobile communications devices below are often described as smartphones, though it should be understood that the devices should not necessarily be so limited.

The Portal App

To enhance the experience of the attendees/participants having a smartphone, for example, the present invention provides for an app that greatly enhances the experience of the attendee/participants and of the moderator/host. As one example, the app allows the attendee/participant to permit the app automatically to download, or for the attendee to post his or her profile for viewing by other attendee/participants. This profile can be a so-called social networking profile, such as a user's Facebook and LinkedIn profile, or it can be a profile from an attendee's company, school, or organization's website. It can be a profile created for the event at registration or created on the app itself by the attendee for general use or specifically for each event. The app can allow each person to access for every gathering he or she has ever attended where the app was used, the profiles of presenters and attendees and the URLs for websites, Powerpoints, videos, graphics, photos and publications provided to, by and for the participants at the gathering. Using application programming interfaces (APIs), the app acts as a platform so that providers of other meeting related apps can provide functionality and branding of their apps to the attendee/participant/audience members without attendees having to leave the app. Furthermore, the app includes functions by which a programmable personal mobile communications device, such as a smartphone, with permission, can allow its holder to become the moderator or host to "run" the meeting or gathering.

Attendees use the app by downloading it from the Apple app store or Google Play Store. This download is facilitated by meeting organizers when attendees register for a meeting, student's sign up for a class, worshipers join a church, and so on. Fortunately, once the app is downloaded, it does not have to be downloaded for each event. It works for all events that use the app. Attendees have to become associated with the event and the Wi-Fi network used at the event. They may become automatically connected by a location service type of association as they walk in or near the room. Alternatively, they may have to enter an event pass code that they know in advance or are given visually or orally when they walk in. The moderator or system incorporated in a device controlled by the moderator, speaker or meeting organizer automatically accepts or rejects access depending on pre registration or as determined by each event. The app automatically connects to the appropriate WiFi network as entered by the moderator, speaker or meeting organizer. Or, failing that, the attendee is provided with the WiFi Network's name and password.

Once connected, the device that receives the attendee's WiFi data, which may be the moderators's smartphone for example keeps a record of all of the attendee's phone identifying information, attendee's profile, and attendee's voice and data entries. This information is retained according to the rules established by and agreed to by the attendees and the meeting organizer in order to create the agreed upon balance between privacy and functionality such as the attendee's ability to retrieve meeting information year's later, and the attendee's confidence in the security and protections from misuse provided by the meeting organizer.

Many functions of the app will be optional such as the ability of a moderator to allow an open mic where all participants will take turns in a polite manner, (or not) as they do in meetings where more than one person has a live mic at the same time. Another option is for the moderator to cut off a long-winded speaker, or even to edit a prerecorded speaker. This would be similar to a call-in radio show.

One particularly useful option for a meeting organizer is a "Welcome Screen" that confirms that the user is in the right room at the right time. In one embodiment, the user was recognized by a location system when the user came into the WiFi' reception area. As an example, the "Welcome" screen reads, "Welcome, (User's Name) to the (Name of meeting) meeting, and the screen offers the user the option to view pre-meeting materials, loaded by the meeting organizer such as the attendee list; attendee bios; the meeting agenda or a program; relevant URLs; a list of Sponsors and speaker bios.

The app provides the opportunity for each attendee to make comments, during the meeting or when determined by the meeting organizer, and it displays running comments by attendees. The comments are threaded, to maintain coherence. They can be time stamped, and are displayed with at least the name of the attendee/commenter. They also can include the photograph of the attendee/commenter if supplied, and even the attendees' title and other profile information. It is now fairly conventional for meeting attendees to use Twitter® to post comments about the meeting as the meeting is taking place. Sometimes, these comments are simply short updates of what is going on in the meeting. They are usually posted to a Twitter #hashtag (a Twitter link to Tweets about a topic) identifying the meeting. If the attendees can, they usually like to use the same #hashtag so readers can follow all everyone's comments. The app allows the meeting organizer to build in the #hashtag for the event/meeting. Then, the user does not have to be concerned about entering the right #hashtag, indeed any #hashtag. The user sees the Twitter® ikon on each a screen the user is using anyway, touches on the ikon, and the keyboard and comment space appears. The Tweet automatically goes to the right #hashtag.

The app provides a display of the event's video, PowerPoints, graphics, and photos on the attendee's screen, sometimes optimized or zoomable for easy viewing and it provides audio directly from the presenter's microphone and directly from attendees using the app which audio will then be able to be heard with minimal distortion directly over the attendee's earphones, headphone's, Bluetooth receivers or built-in device speakers.

The app makes possible, using to use the camera in the personal mobile device, to show the attendee talking over the event's video display system. Similarly, attendees using the app can upload data from their personal mobile device for display on the event's video display system, and/or for other attendee's and the event organizer to download on to their devices or to the cloud for later retrieval.

It is expected that the app will be controlled by a company (the Company) that owns or licenses the technology being described herein. The Company or its agents will monetize, or at least control the operation of the technology, by maintaining a system that utilizes an Internet connection to the Company's servers. These servers, which may be operated by others on behalf of the Company, will, by talking to the app, and accepting payments authorize a meeting organizer to host an event and provide means for the meeting organizer to pay for the service using the app. The servers also will allow a meeting organizer to authorize users to participate in the event, also using the app. And, when appropriate, the servers also will allow users to pay the meeting organizer directly. Rules established by the meeting organizer and maintained by the company's servers will keep events from overlapping using log-in passwords or codes that can be entered manually by meeting organizers and users, or automatically by the app itself once a pre-registration process has been completed with the Company's servers.

As examples of the appearance of the app on a smartphone, FIG. 3 shows some wireframe screens for a meeting attendee/participant on the left and for a host/moderator of the meeting on the right. The participant screen shows that the attendee/participant has the floor and is connected to the public address system. The smartphone is functioning as a microphone ("Microphone is live!"). Also shown on the screen is the title for the meeting and the date at the screen top. Immediately below is the status of microphone function and a Stop Meeting icon which is discussed below. At the bottom of the screen is a bar including Meeting Logs, People, Current Meeting and Settings icons. More details are found further below.

The screen for host/moderator shows that his/her smartphone in the queuing function, i.e., managing the list of attendee/participants who have called into the central receiving function and are now waiting to have the floor, i.e., to have their personal mobile communications device activated as a microphone. The screen also shows the name of the meeting, "Staff Meeting," at the stop of the screen and has the same icon bar at the bottom as does the attendee/participant screen. Of course, the icon bar could also be different.

The Queuing function also allows the host/moderator to manage the queue of people who wish to have the floor and "the microphone." As shown in the drawing, the screen places the people in order of the receipt of his/her call into the host/moderator. As each person completes his time on the floor, the positions of the other persons in the queue advance to the top and the person reaching the top has his or her device activated as a microphone. The host can also move positions of persons in the queue around. Furthermore, if some of the attendees/participants' questions are in text form, the host/moderator can select those questions from the queue. The host/moderator can also check information about the attendee/participant from their profiles as posted in their LinkedIn, Facebook, etc. accounts. Questions which are not answered at the meeting are archived to allow the panelists to respond later through email, text or voice. As in the case of the participant screen the host screen at the bottom also has Meeting Logs, People, Current Meeting and Settings icons. Questions are recorded and/or texted to the host/moderator.

To enter the app the user performs an initial sign-in on his personal mobile communications device. To obtain the app the user downloads the app from one or more network servers. The actual locations of the servers might be in the "cloud," as is common today. The personal mobile communications device, such as a smartphone, with the downloaded code and with the assets in the "cloud," and other network locations, performs the functions and operations described below.

Figure 4:
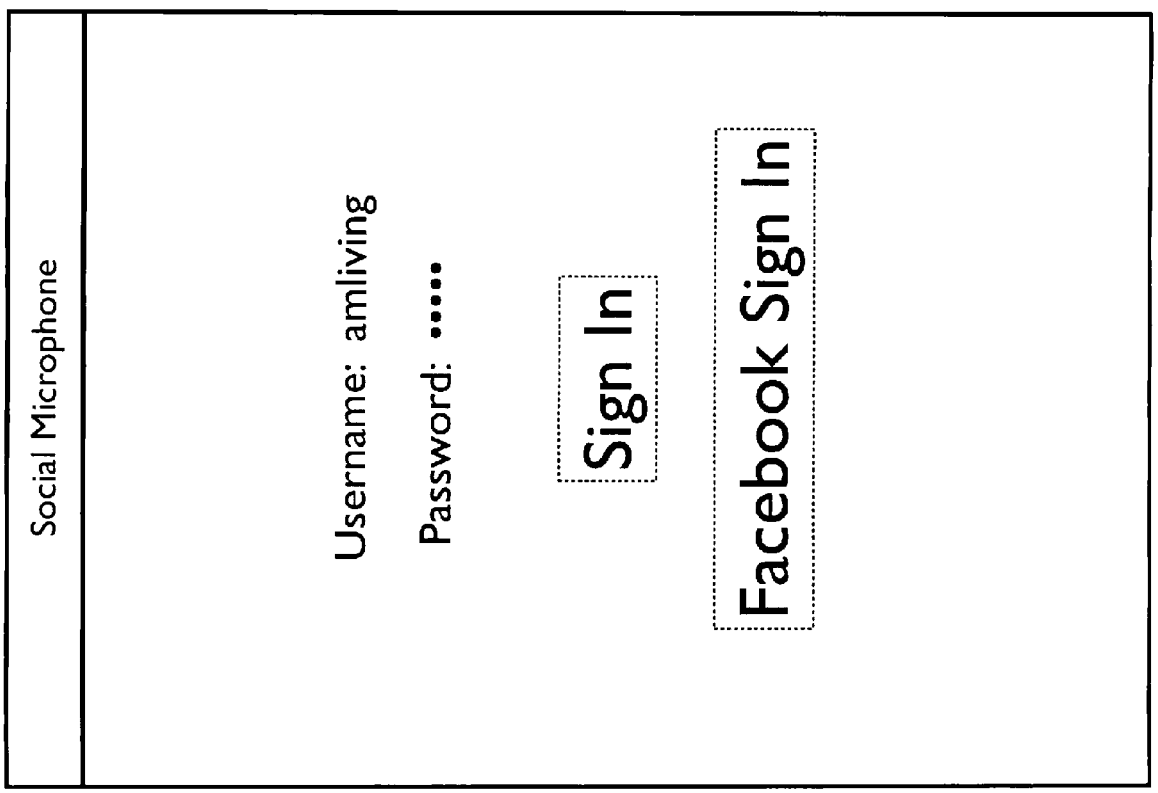
FIG. 4 shows a user sign-in wireframe screen for the app in accordance with one embodiment of the present invention.

FIG. 4 illustrates a wireframe for the initial app user sign-in screen shown in FIG. 4. The screen has a place for a user name, password and sign-ins to social networks (Facebook is shown in the drawing). During the sign-in process, the user is requested for the user's Facebook, LinkedIn, Twitter and other social networking profiles credentials to permit integration of these social networking data with the app. For example, through the app other attendees/participants can automatically see the social networking information of the attendees/participant and the moderator/host on the microphone. The user credentials are stored in an app network server, or somewhere in the cloud, for verification purposes.

Figure 5:
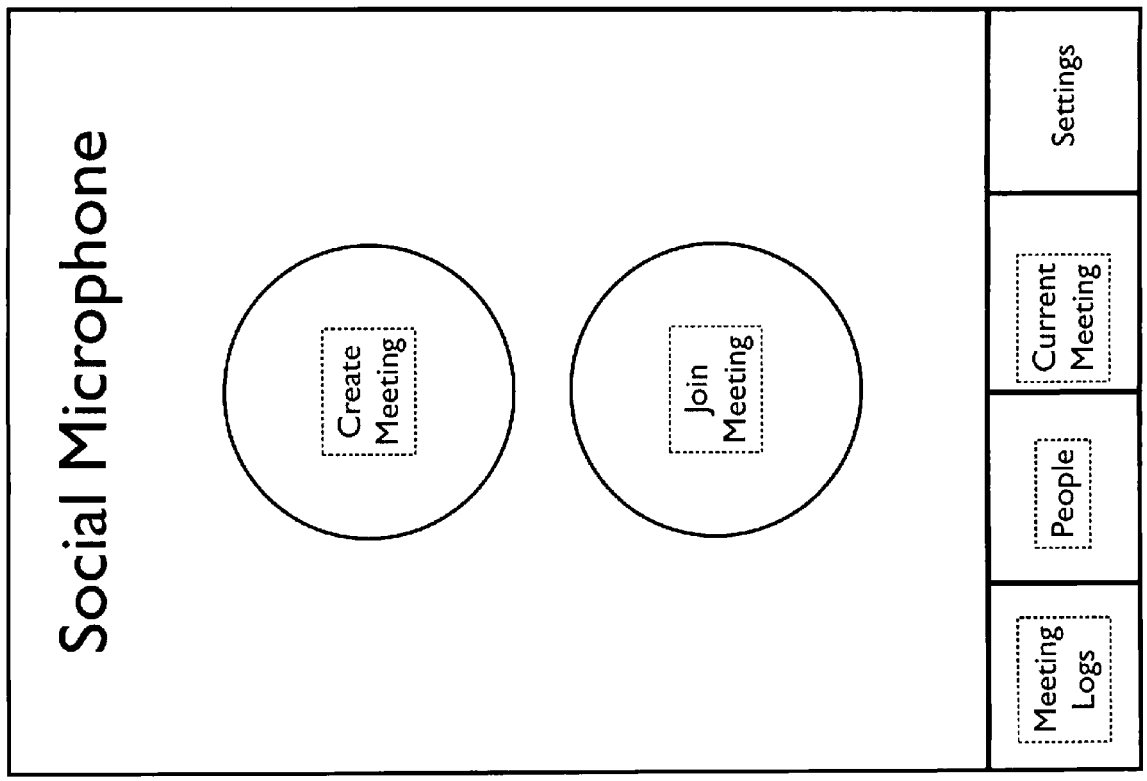
FIG. 5 shows an initial wireframe screen by which the user can elect to be become a moderator/host for a meeting or to become a attendee/participant of a meeting in accordance with an embodiment of the present invention.

Having entered the app, the user is faced with an initial screen shown by a wireframe in FIG. 5. This screen allows the app user to select between becoming a meeting host/moderator or becoming a meeting attendee/participant. If the user selects the "Create Meeting" icon, then the user becomes the host/moderator of the created meeting. The functions of a host/moderator of the app are engaged. If the user selects the "Join Meeting" icon, the user becomes an audience member and the functions of attendee/participant are engaged. Alternatively, the apps for a moderator/host and an attendee/participant can be separated so that upon signing-in, the user is recognized as a moderator/host or an attendee/participant and the appropriate functions appear on the user's app.

The App for the Moderator/Host

Figure 6:
FIG. 6 shows a wireframe screen by which a moderator/host creates a session or meeting with the app.
Figure 7:
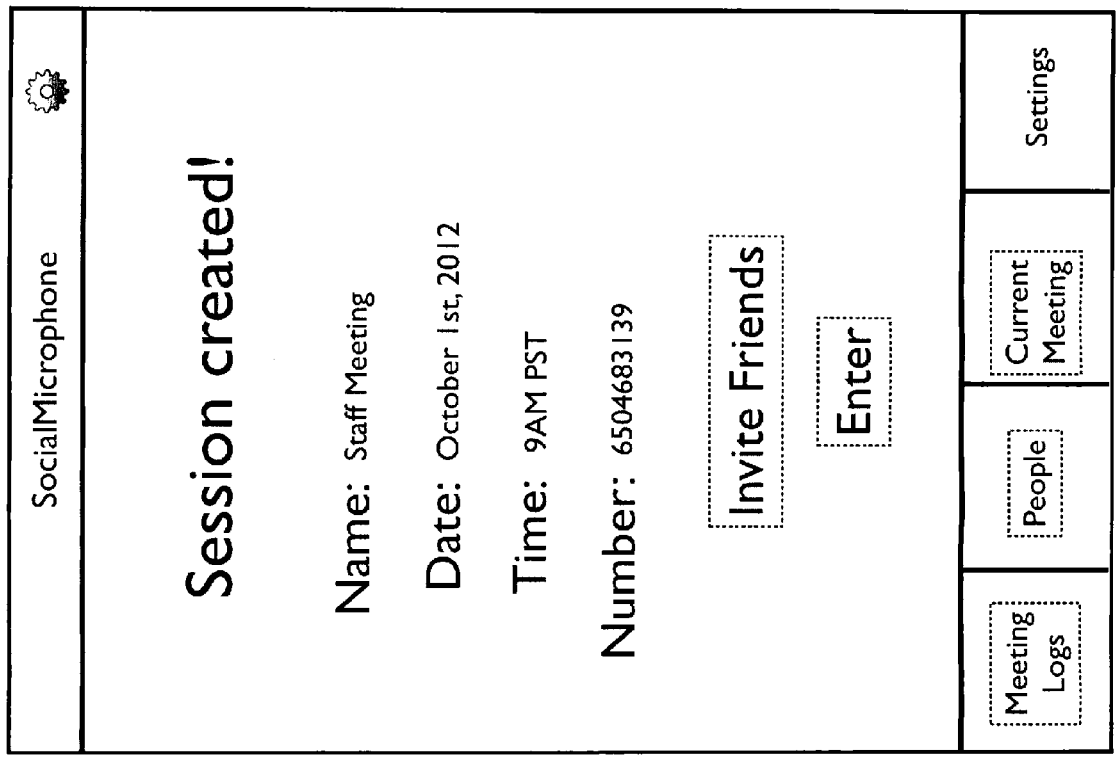
FIG. 7 shows a wireframe screen indicating that a session or meeting has been created for the moderator/host.

Assuming that the user of the app selects the Create Meeting icon, a Create Session screen appears as represented by the wireframe shown in FIG. 6. To create a session or meeting, the user fills the information of the name of the session, a description of the session, its date and time, and a unique number generated by the app so as to identify the session, and then engages the Create icon to store the session information. The app then proceeds to the wireframe screen shown in FIG. 7 which confirms the creation of the session and its particulars. Additionally the screen shows two icons, Invite Friends and Enter Session.

Figure 8A:
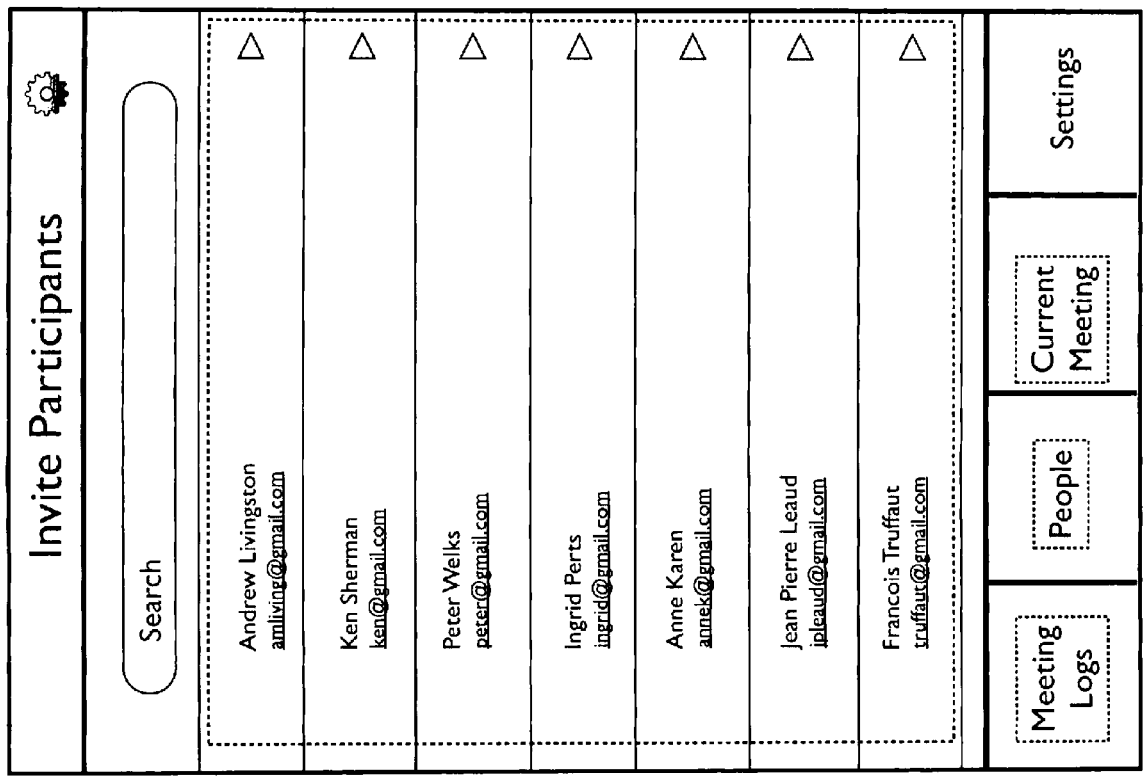
FIG. 8A shows a moderator/host wireframe screen to a list of attendee/participants to invite to the created session.
Figure 8B:
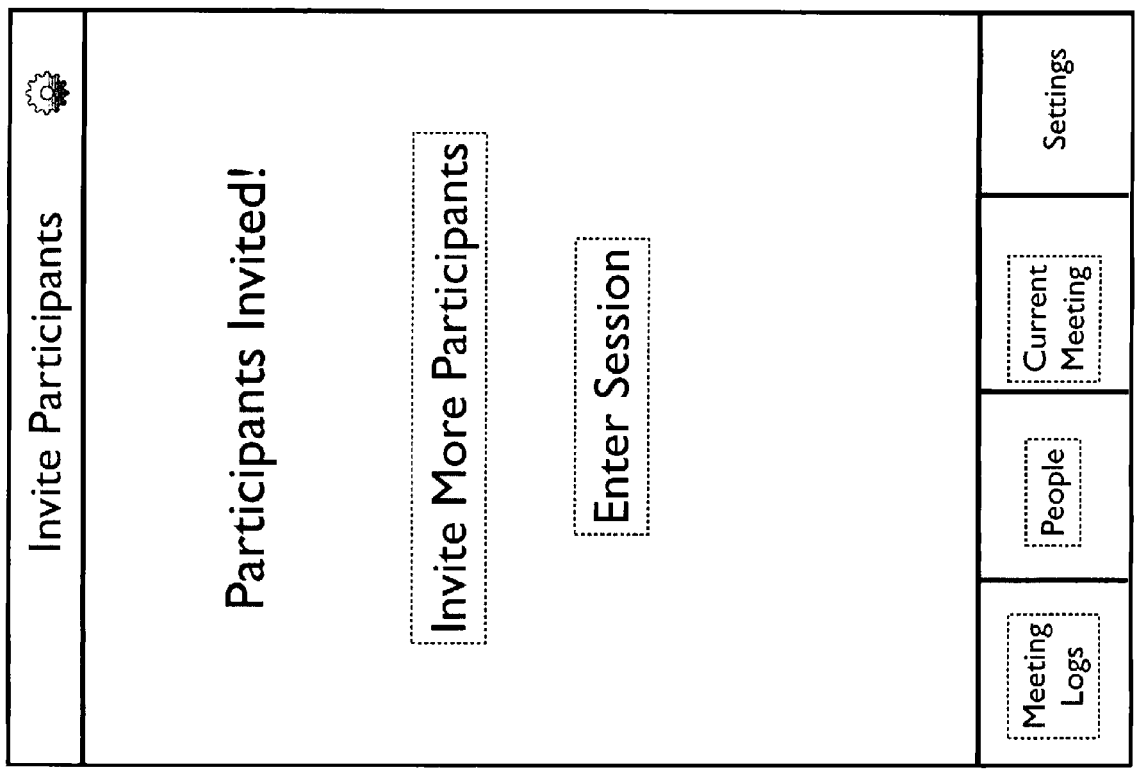
FIG. 8B shows a following wireframe screen which indicates that the FIG. 8A participants have been invited, and that more participants may be invited, or the app should enter the created session.

The Invite Friends icon when engaged moves the process of the app to the Invite Participants function and wireframe screen shown in FIG. 8A. Here the moderator/host creates a list of attendees/participants to join the created meeting. The list is drawn from the user's contact list drawn from the app itself, social media and other locations. Note that there is search function on the screen to help the moderator/host create the list. Notification of the persons on the list is made by email, text, phone call or notification within the app for those persons who also have the described app in their personal mobile communications device. Having notified all the persons on the list, the app moves to a Participants Invited screen as shown by the wireframe shown in FIG. 8B. Through an Invite More Participants icon the user returns to the Invite Participants screen shown in FIG. 8A through which function the user can invite more attendee/participants to the session. The data of the identities of the invited participants and their electronic addresses are stored for other functions, such as the NDA function discussed below.

Figure 9:
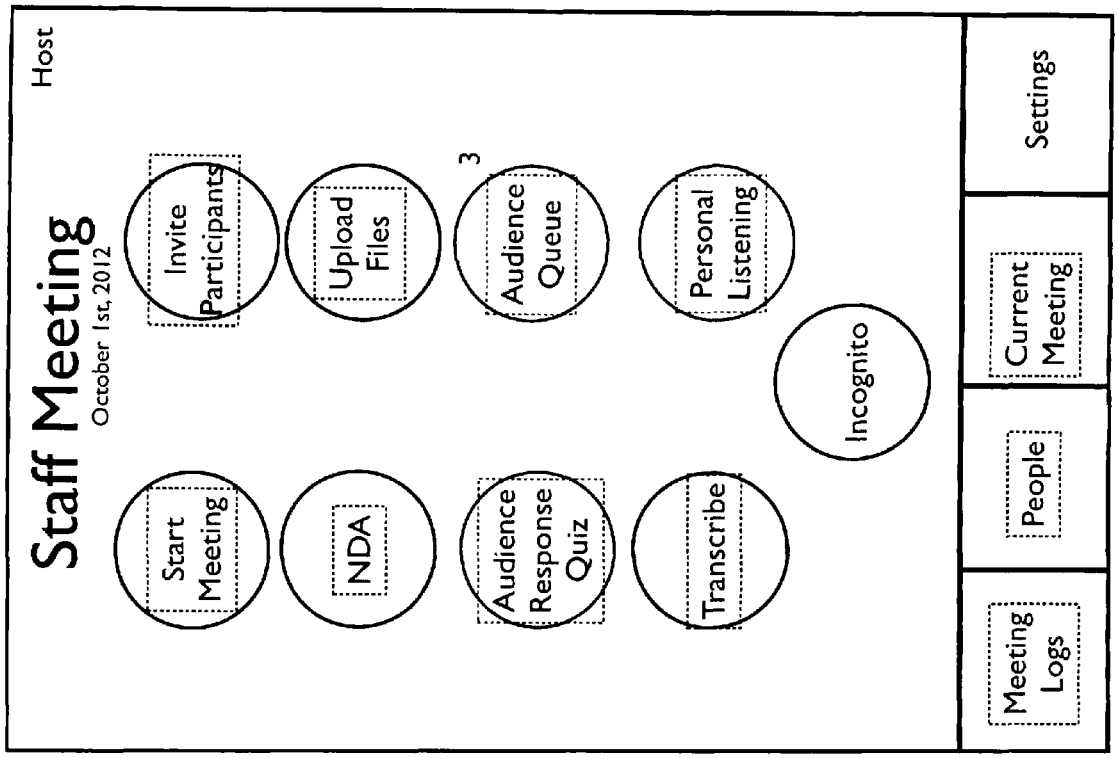
FIG. 9 shows a moderator/host wireframe home screen for a yet-to-begin session with many different meeting functions available through the icons on the screen.

The Enter Session icon engagement leads to the session screen illustrated by the wireframe of FIG. 9. This is the home screen for the moderator/host. The name and date of the session is located at the top of the screen and a set of icons: Start Meeting, Invite Participants, NDA, Upload Files, Audience Response Quiz, Audience Queue, Transcribe, Personal Listening, Incognito, is placed below. At the bottom of the screen interface there is a bar with four navigation icons, Meeting Logs, People, Current Meeting and Setting. The Meeting Logs icon allows a user to access all information from all previous meetings where the app was used. The People icon has two components: the Current Meeting tab, which shows all of the audience members currently in attendance, and the My Friends tab, which is a list of all of the people the user has added to his contact list. This allows the user to access information about people they've met at previous gatherings. The Current Meeting icon brings the user back to the homepage for the meeting he is currently attending. Finally the Settings icon allows the user can change details about his or her account, i.e., password, email address, display name, photograph, social media connections, etc.

Returning to the top of FIG. 9, engagement of the Start Meeting icon can start the meeting which begins the recording process. This is performed automatically so that an audio record of the meeting is made and stored. The app also indicates that the meeting has started. The Invite Participants icon leads back to the screen shown in FIG. 8A so that the host can invite (possibly more) session participants. The attendee/participants to be invited can be found through the People icon in the bar at the bottom the screen. The NDA icon leads to the wireframe screen of FIG. 12A; the Upload Files icon leads to the wireframe screen of FIG. 13; the Audience Response Quiz icon leads to the wireframe screen of FIG. 14A; the Audience Queue icon leads to the wireframe screen of FIG. 16A; the Transcribe icon leads to the wireframe screen of FIG. 17; and the Personal Listening icon leads to the wireframe screen of FIG. 18. These functions and screens are discussed in further detail below and many of the function/screens have counterparts for the attendee/participant also.

Figure 10:
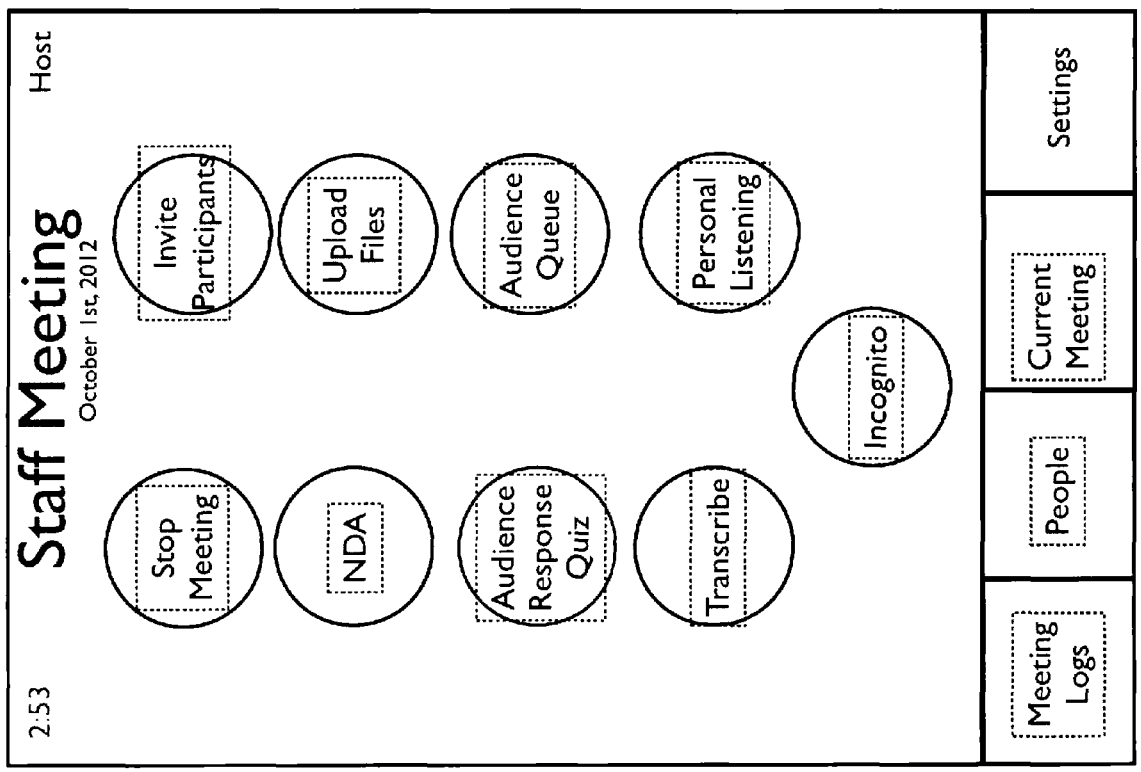
FIG. 10 shows a moderator/host wireframe screen for the created session of FIG. 9 after the meeting has started.

FIG. 10 shows the wireframe screen for the host/moderator once the session has started, i.e., the Start Meeting icon of FIG. 9 has been engaged. Note that the screen of FIG. 10 has a time in the upper left-hand corner which indicates the time lapse since the start of the meeting. The name and date of the session is located at the top of the screen and a set of icons are located below. The icons are same as those shown in FIG. 9, except a Stop Meeting icon substitutes for the Start Meeting icon. The Stop Meeting icon ends the meeting and the functions associated with the meeting, including the recording of the meeting. FIG. 11 shows the screen of FIG. 10 when the Incognito icon has been engaged. As shown in FIG. 11, the icon has a different font from that of FIG. 10, such as a different size, weight, typeface, a different color, a combination of these characteristics, or some other indicator that the Incognito function has been engaged. Engagement of the Incognito icon renders the host/moderator "invisible" to other members of the session. That is, the profile of the host/moderator is not displayed as he or she speaks nor are members of the audience able to identify the host/moderator through the People icon, shown at the bottom of all the screens, including FIG. 9.

Figure 12A:
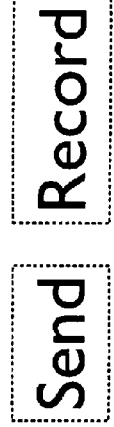
FIG. 12A shows a moderator/host screen with a nondisclosure agreement for the created session after the NDA function icon has been clicked; the screen of FIG. 12B indicates that the nondisclosure agreement has been electronically distributed to the attendee/participants of the session.
Figure 12B:
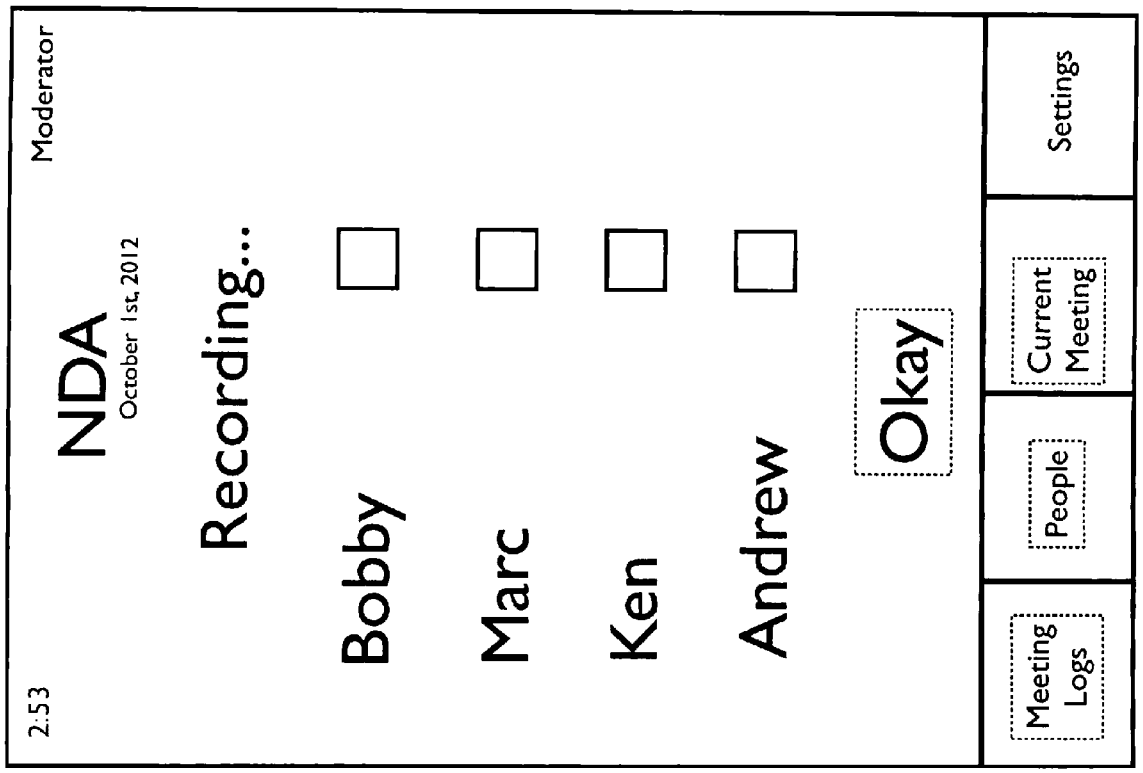
FIG. 12C shows the initial NDA function screen awaiting the response to the distributed nondisclosure agreement.
FIG. 12D shows the screen a time later by which one attendee/participant has responded.
FIG. 12E shows the screen even later by two more attendee/participants have responded.
Figure 12C:

When the NDA (Non-disclosure Agreement) icon is engaged, the app moves to the wireframe screen shown in FIG. 12A. The app has a non-disclosure agreement which may be uploaded from the host/moderator's library or through integration with file storage services, such as Docusign, Dropbox, Box and/or the like. The host/moderator then sends the agreement to all the attendees/participants at the session by the Send icon for their signatures and records the acceptances (and possible rejections) of the NDA by the attendee/participants by the Record icon at the bottom of the screen. The Record icon allows the host/moderator to record a voice stamp "inside" the NDA. These operations are performed electrically through the personal mobile communications devices of the attendee/participants to the session. This NDA function allows the host/moderator to easily maintain the subject matter of the session under confidentiality. FIG. 12B shows the wireframe screen as the moderator/host awaits responses from the attendee/participants at the meeting. FIG. 12C indicates that Bobby has responded with a check next to his name and voice recording symbol for a real-time confirmation that the NDA is being signed. FIG. 12D shows that more attendee/participants, Marc and Andrew, have also responded and FIG. 12E shows that all attendee/participants have accepted the NDA.

FIG. 13 shows a wireframe screen which appears after the host/moderator engages the Upload Files icon (FIG. 9). This allows the app user to browse and upload files from personal hard disk, other file storage services, such as Docusign, Dropbox, Box and/or the like, which locations are shown in the top half of the screen for selection. These files may then be uploaded for distribution to attendee/participants of the session and other servers.

Figure 14E:
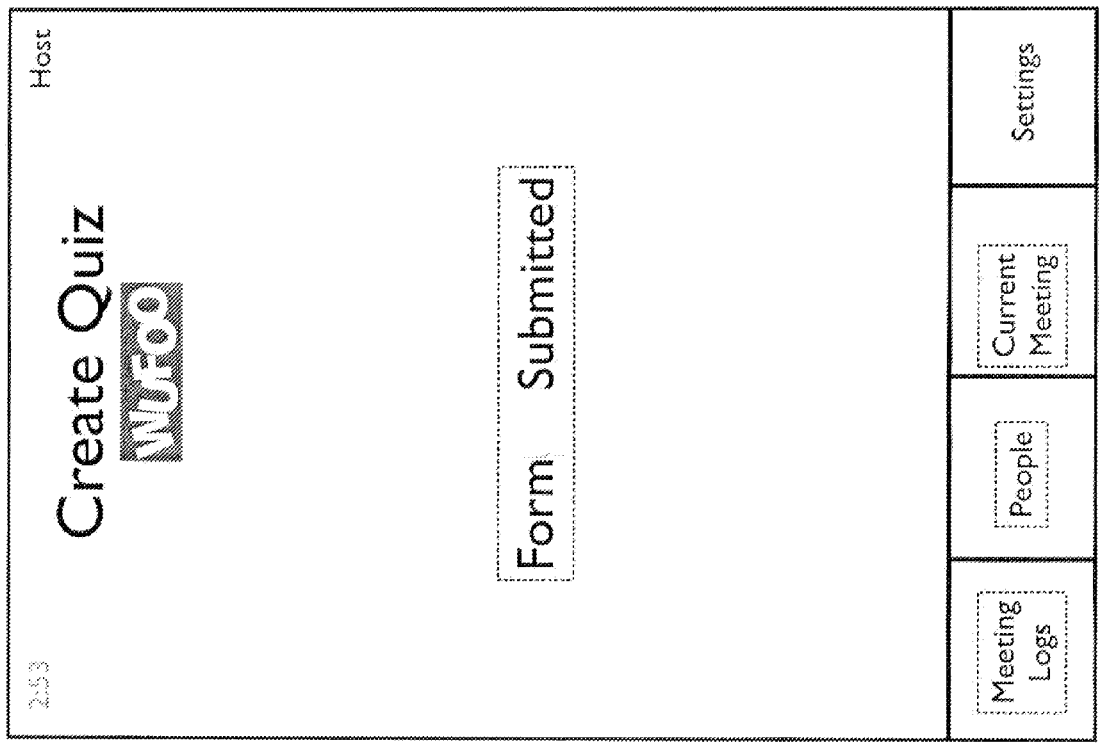
FIG. 14A shows a screen for the submission of a quiz form after the Audience Response Quiz icon of FIG. 9 (or 10)
FIG. 14B shows a screen after the form has been submitted.
Figure 14A:
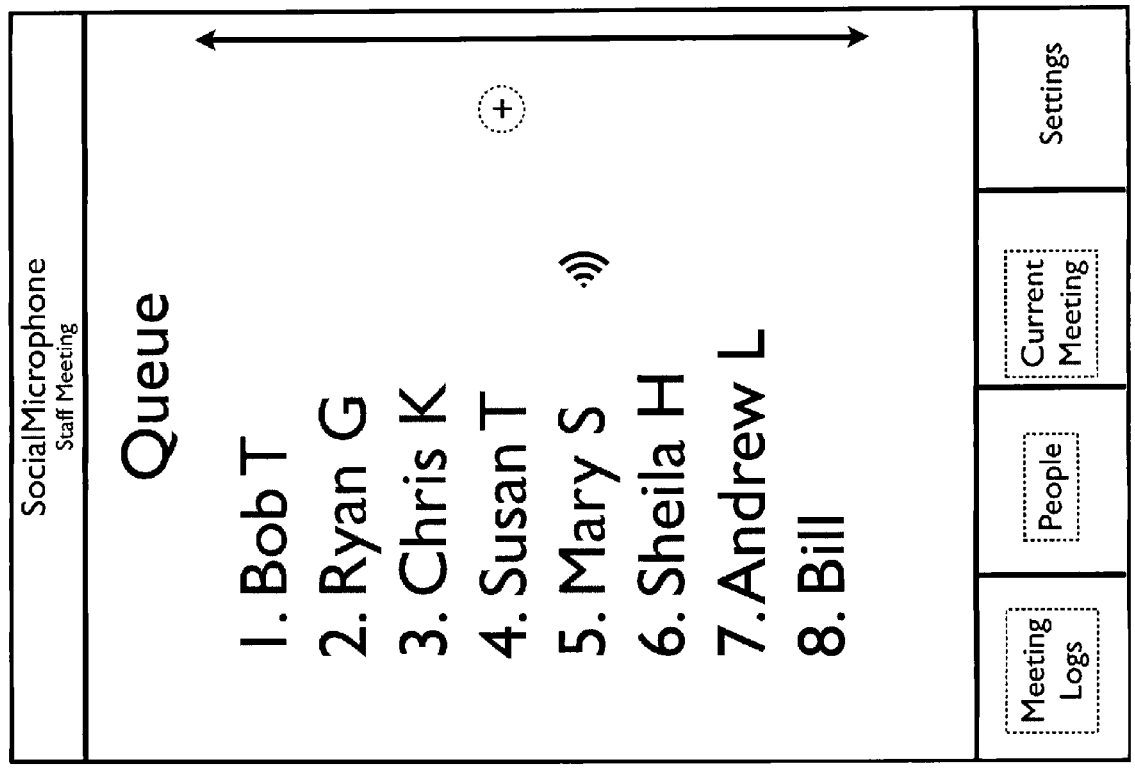

With the engagement of the Audience Response Quiz icon (FIG. 9), the host/moderator can create an audience participation quiz or survey to determine the effectiveness of the session. Besides using the app's own quizzes, the app also can integrate third-party quiz creation services, such as Survey Monkey or WuFoo, for example. The wireframe screen of FIG. 14A shows an initial form to be filed out by the host/moderator for submission. Upon submission of the form, the screen of FIG. 14B confirms that the form has been created, the quiz or survey created and distributed to the attendee/participants of the meeting. The results of the quiz can be held by the host/moderator or broadcast for the attendee/participants to see.

Figure 16B:
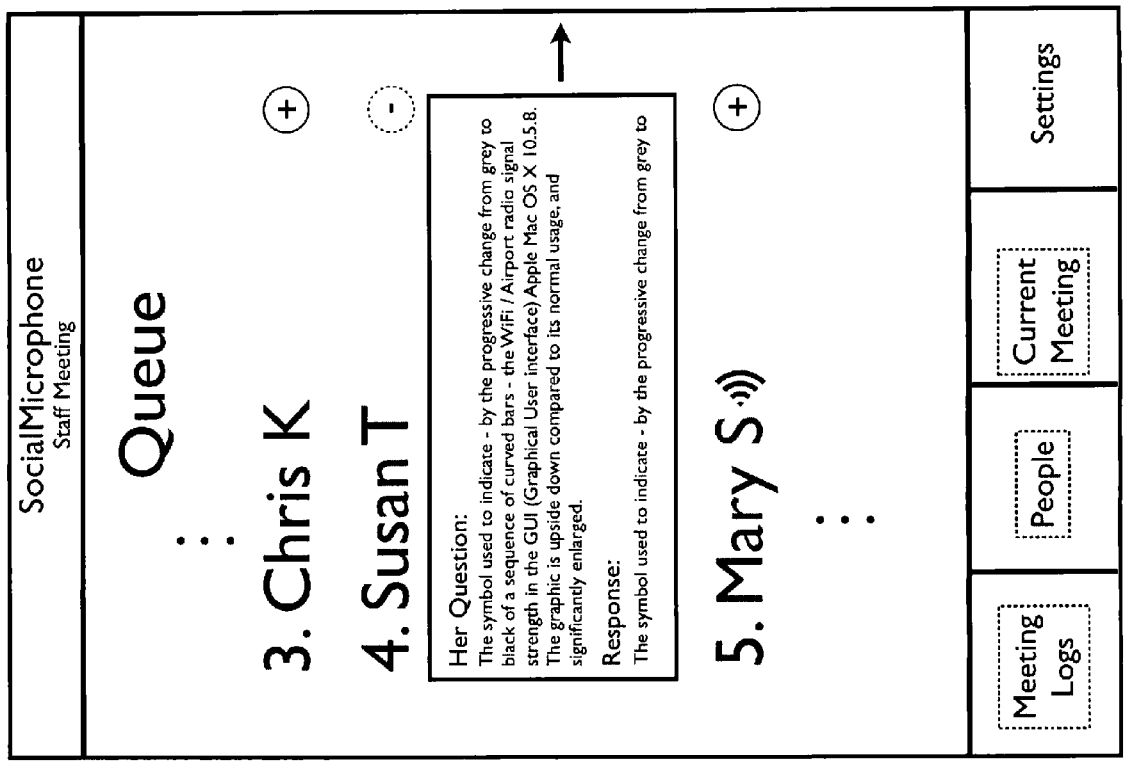
FIG. 16B shows the FIG. 16A screen after moderator/host user has clicked to find the question of a person in the queue.

The Audience Queue function allows the host/moderator to manage the attendee/participants who wish to speak at a session. The screen for this function is illustrated by the wireframe screen of FIG. 16A, which shows a list of people who wish to speak. By clicking on the names on the queue list, the host/moderator can view information about the prospective speakers and reorder the list. By clicking on the "+" symbols, the moderator/host can see the question if it has been submitted as illustrated in FIG. 16B for Susan T's question. By clicking on the "−" symbol which has replaced the "+" symbol, the moderator/host can close the question window. The Audience Queue screen also has a Make Open icon to throw the floor open to all the prospective speakers so that they can all use their smartphones to talk at once if they so desire. In this circumstance common courtesy among the speakers is used to govern the speaking order.

Figure 17:
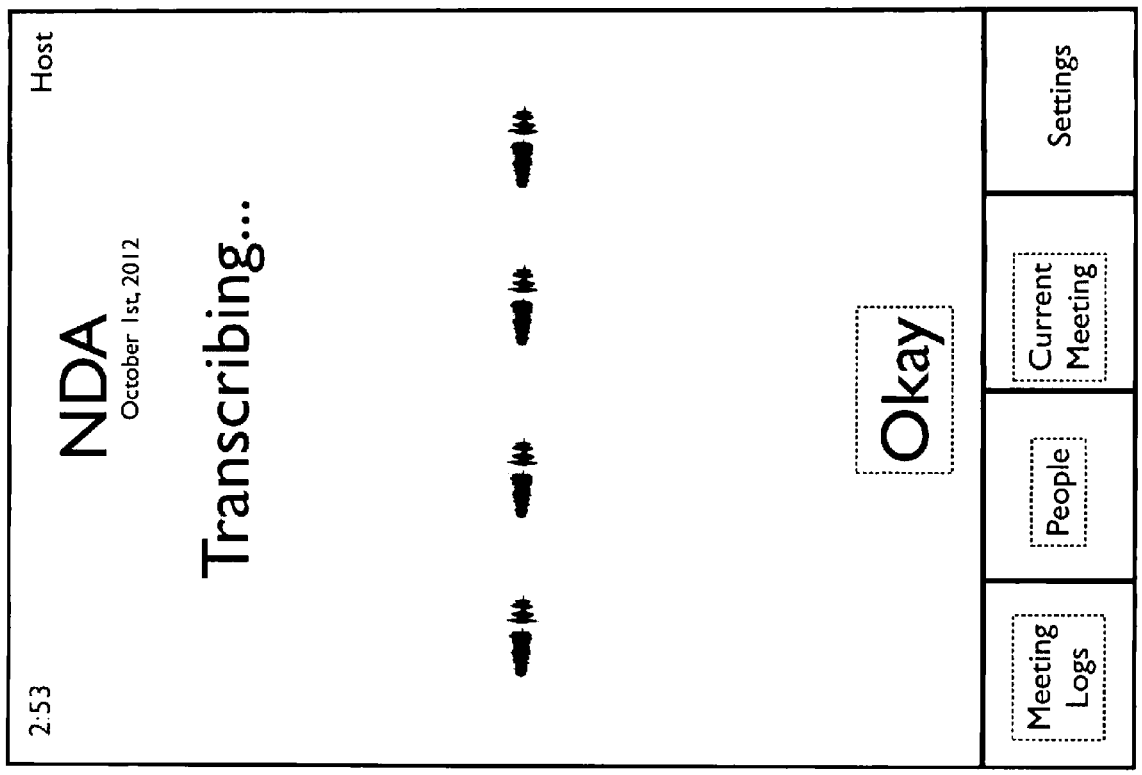
FIG. 17 shows a screen after the moderator/host Transcribe icon (of FIGS. 9 and 10A) has been invoked to transcribe an audio file, in this example, the responses to an nondisclosure agreement (NDA).
Figure 18:
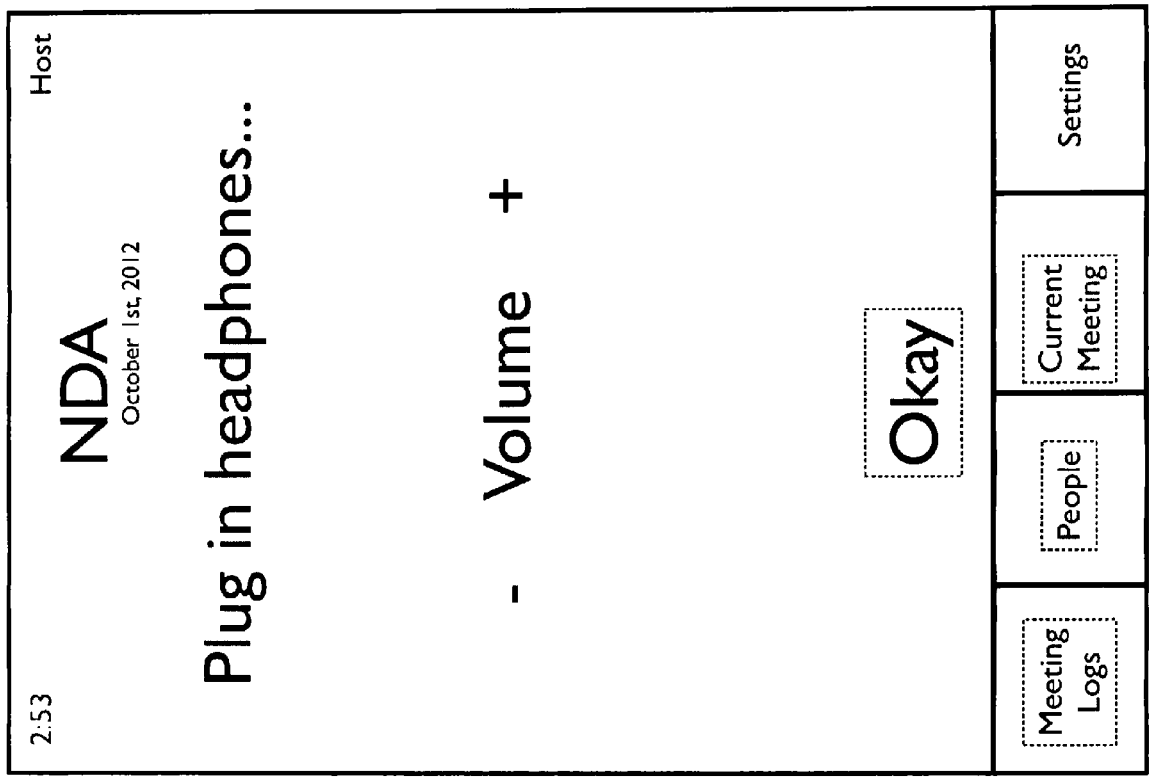
FIG. 18 shows a screen after the moderator/host Personal Listening icon (of FIGS. 9 and 10A) has been invoked to listen to an audio file or the current meeting.

The app allows for the transcription of various audio files. This is initiated through the Transcribe icon (FIG. 9) and the designation of the file to be transcribed. FIG. 17 shows that process of transcribing the attendee/participant responses to the session NDA. Likewise, the various audio files can be listened to through the app (again FIG. 9) and the Personal Listening icon. FIG. 18 shows the screen for the moderator/host to listen to the attendee/participant responses to the NDA with a volume control. It should be noted that through the Personal Listening function, the moderator/host and the attendee/participants can listen to the current meeting through their own personal mobile communications device since the current meeting is being recorded. This feature is a great advantage to those with hearing impairment or those attendee/participants in bad physical locations at the meeting.

Figure 20A:
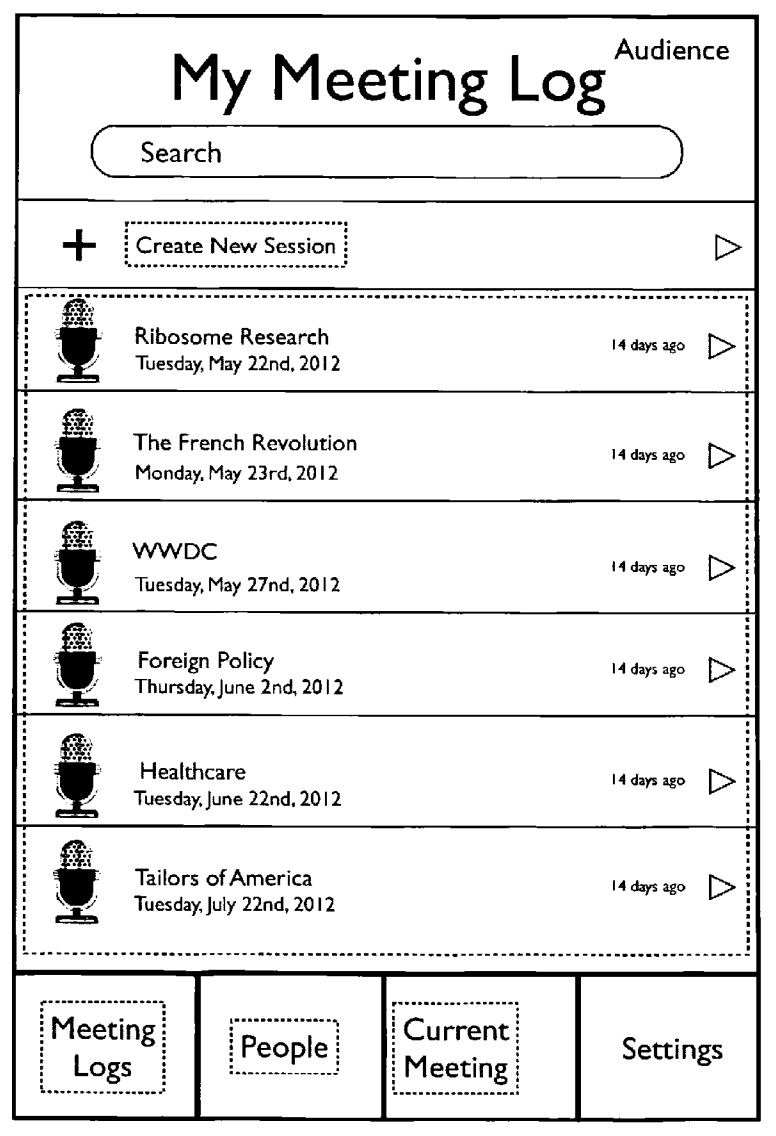
Figure 20B:
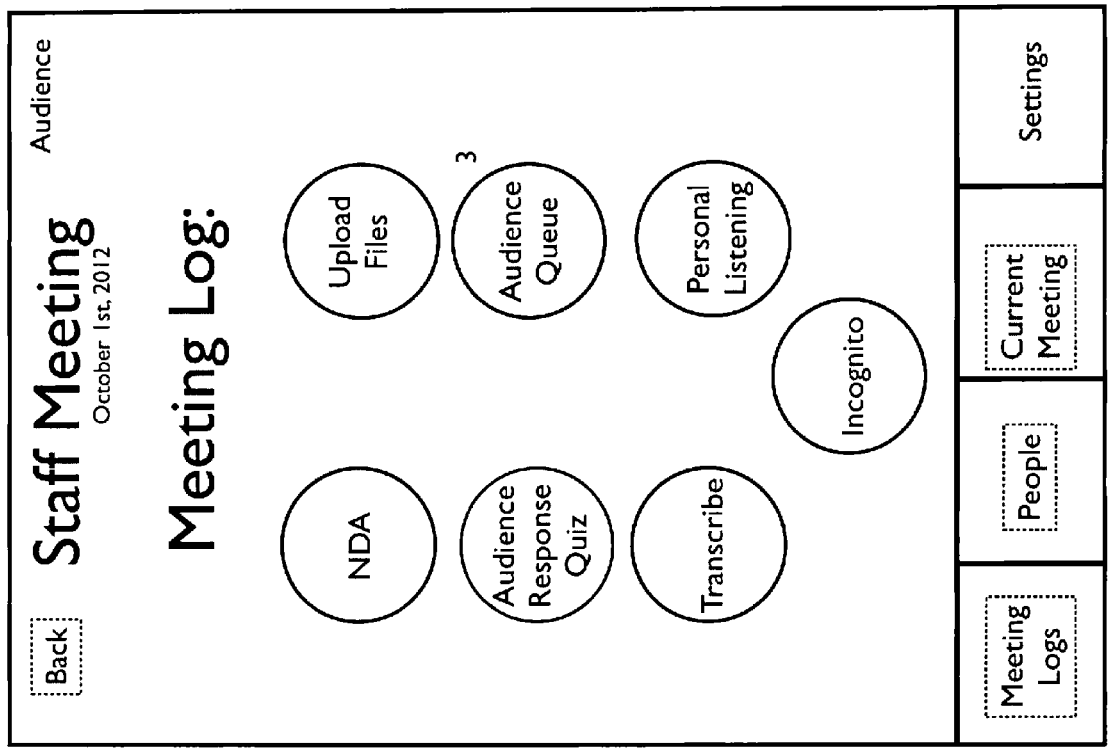
Figure 212:
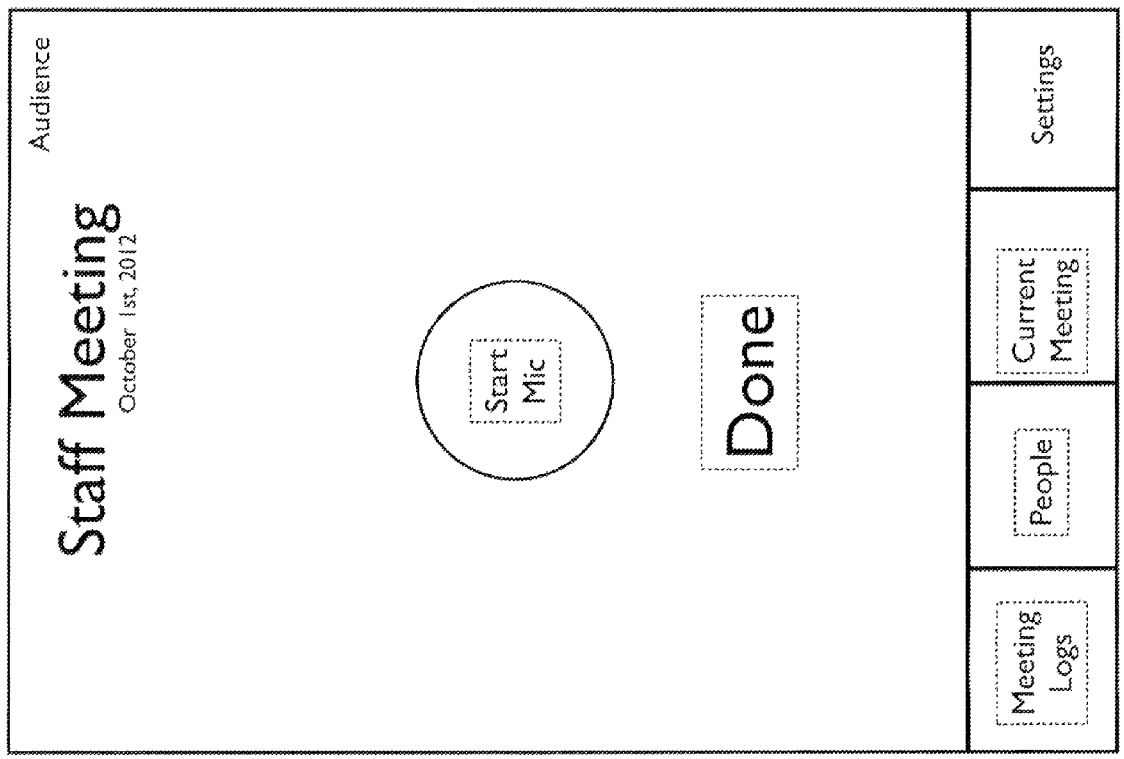

Engagement of the Meeting Logs icon in the bottom screen bar of the screen, see FIG. 9 for example, allows the user to access all information from all of his or her previous meetings. FIG. 20A shows a Meetings Log for an attendee/participant which is the same for a moderator/host. To access meeting information, a user clicks on a meeting and are brought to a 'portal', which gives them access to all the information stored from that meeting. A wireframe screen for information for a meeting is shown in FIG. 20B. The title of the meeting and its date is shown at the top of the screen. The user can see the NDA he was presented with and did or did not sign, through the NDA icon, the files uploaded for that meeting through the Upload Files icon, the audience response quiz he took and its results through the Audience Response icon, a list of questions and questioners at the meeting through the Audience Queue (the number next to the icon indicates that there were 3 questioners) icon, the transcription of the meeting through the Transcribe icon, and a log of his (incognito) status through that icon. Finally, the Personal Listening icon allows the user to listen the audio files of the meeting. This is useful if no transcription of the meeting is available.

Figure 15A:
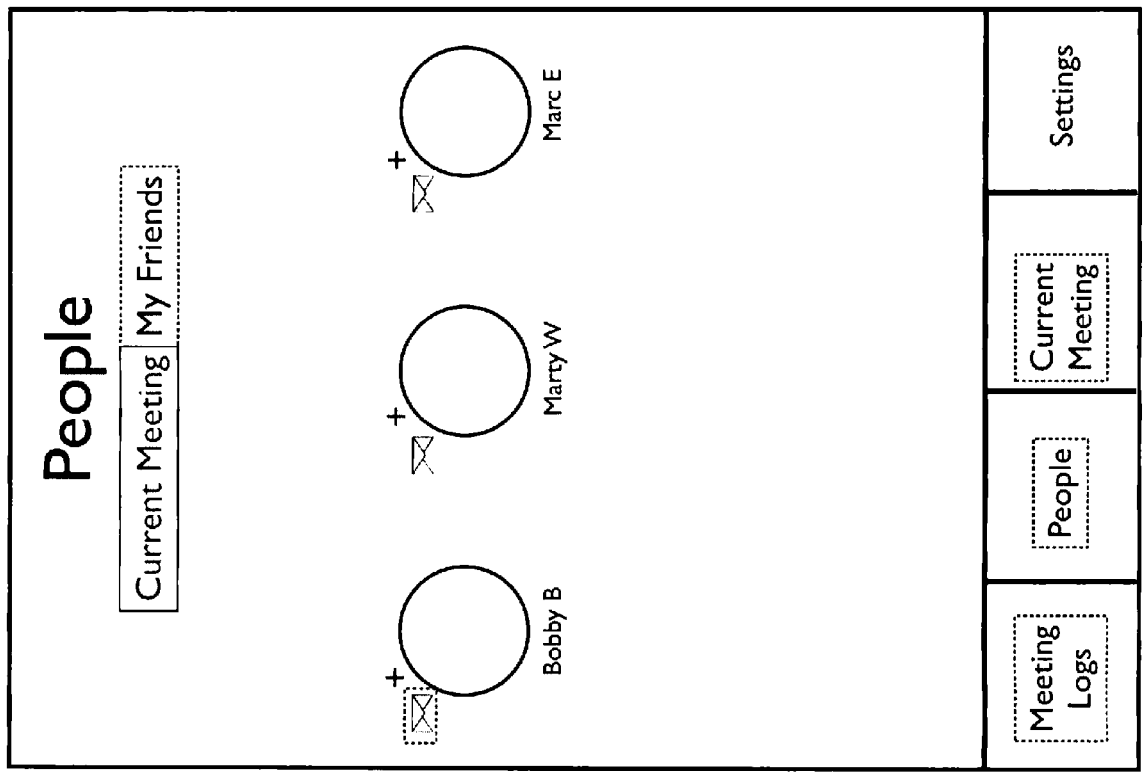
FIG. 15A shows a Current Meeting tab screen of the attendee/participants of the current meeting after the People icon on the constant bottom bar has been clicked.

Engagement of the People icon in the bottom screen bar leads to one of two tabs of the People function: Current Meeting and My Friends. FIG. 15A shows the screen for the Current Meeting tab as indicated by the solid line around the Current Meeting icon below the People title as compared to the dotted line around the My Friends icon in the wireframe screen. Of course, other indicators, such as color, fonts, and the like, may indicate which tab of the People function is operative. In passing it should be noted that in this embodiment of the present invention the tab which appears after the People icon is engaged is the last tab of the People function when the user left that function. Alternatively the particular tab which appears could be randomly selected, or be set in the Settings function.

The screen for the Current Meeting tab shows all of the attendee/participants in attendance at the session, here Bobby B, Marty W and Marc E. The user can send personal messages to these attendee/participants by engaging the small envelope icon next to each circle with the name of each attendee/participant. The text below related to FIG. 15C describes how a message is sent. The user can also add an attendee/participant to his or her My Friends list by engaging the "+" icon next to each attendee/participant circle. My Friends represents a list of contacts which the user has accumulated and allows the user to access information about the contacts through the app.

Figure 15B:
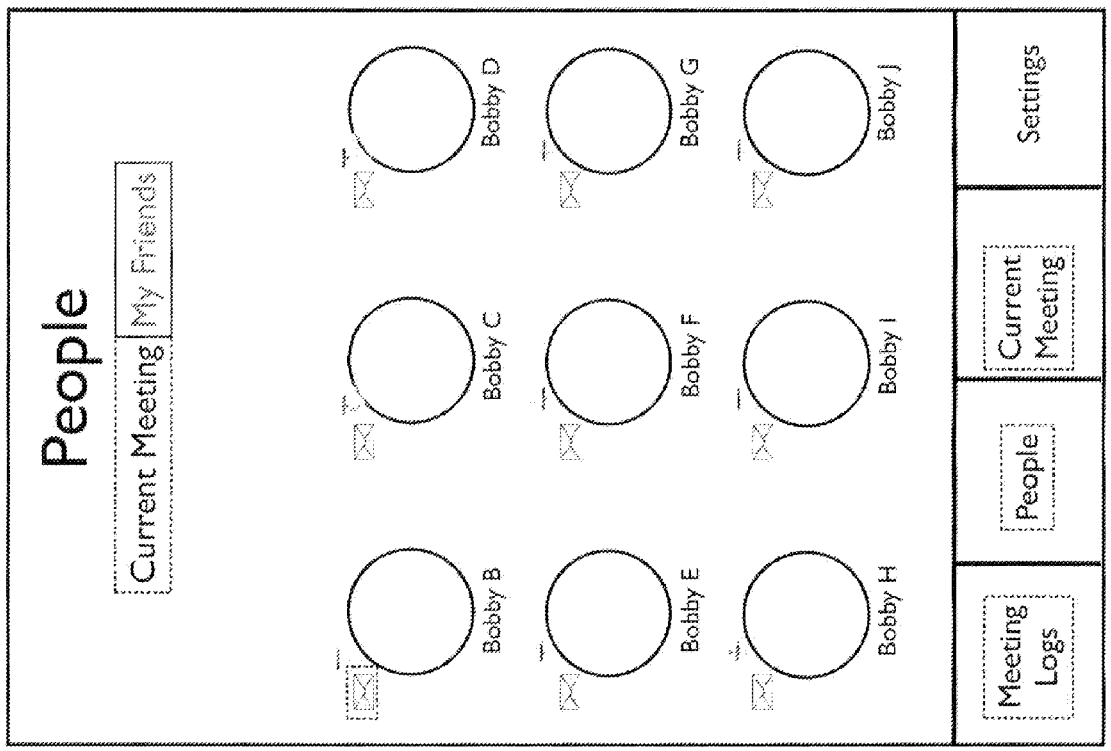
FIG. 15B shows a My Friends tab with the moderator/host contact list.
Figure 15C:
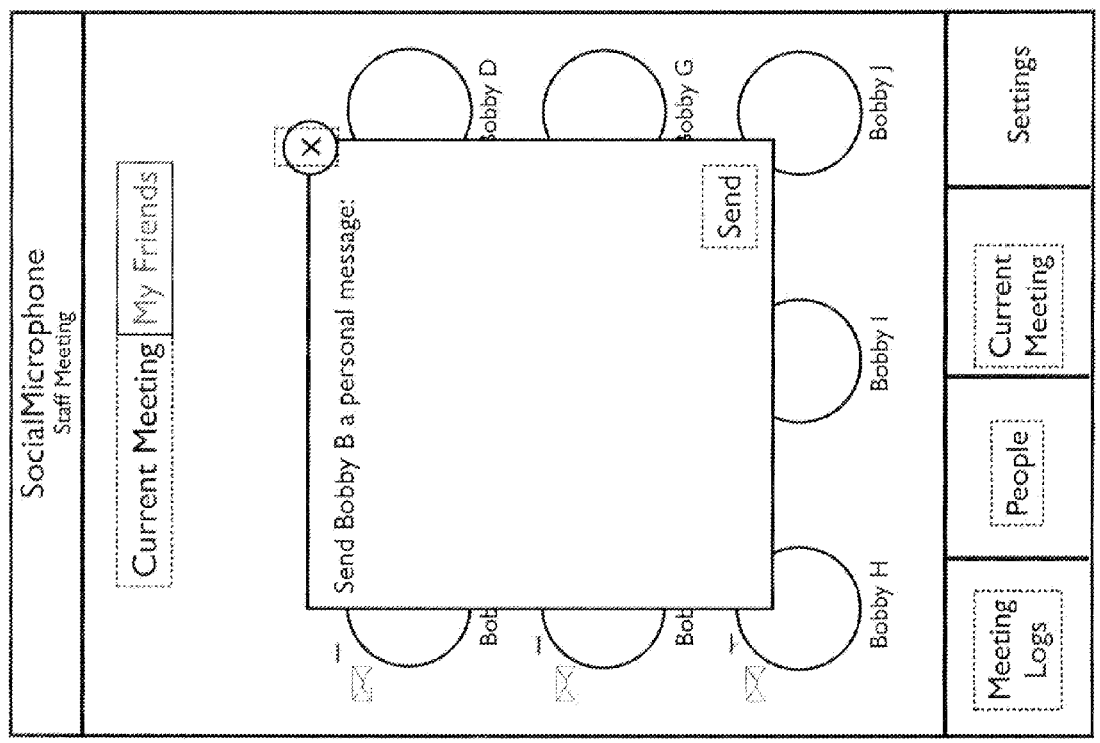
FIG. 15C shows message window in the My Friends tab for sending a message to a person on the contact list.

FIG. 15B shows the screen for the My Friends tab in which the list of contacts starts with "Bobby B" and ends with "Bobby J," for convenience's sake. The My Friends tab is indicated by the solid line around "My Friends" below the People title. As stated above, the user can send messages to his "friends" by engaging the small envelope icon next to each circle with the name of each contact. A "−" next to each circle allows the user to drop the person from the contact list. After the envelope icon is engaged, an envelope appears on the screen in which the personal message (to Bobby B in this example) is placed, as illustrated in FIG. 15C. FIG. 15D shows when a user receives a personal message from someone on his contact list. In the example shown, the "1" symbol near the envelope associated with Bobby B indicate that that person has sent one message to the user.

As stated earlier, engaging the Current Meeting icon in the bar returns the user to the meeting he or she is currently hosting and the FIG. 10 screen. The Setting icon allows the user to change the settings of his app account.

The App for the Attendee/Participant

Figure 19:
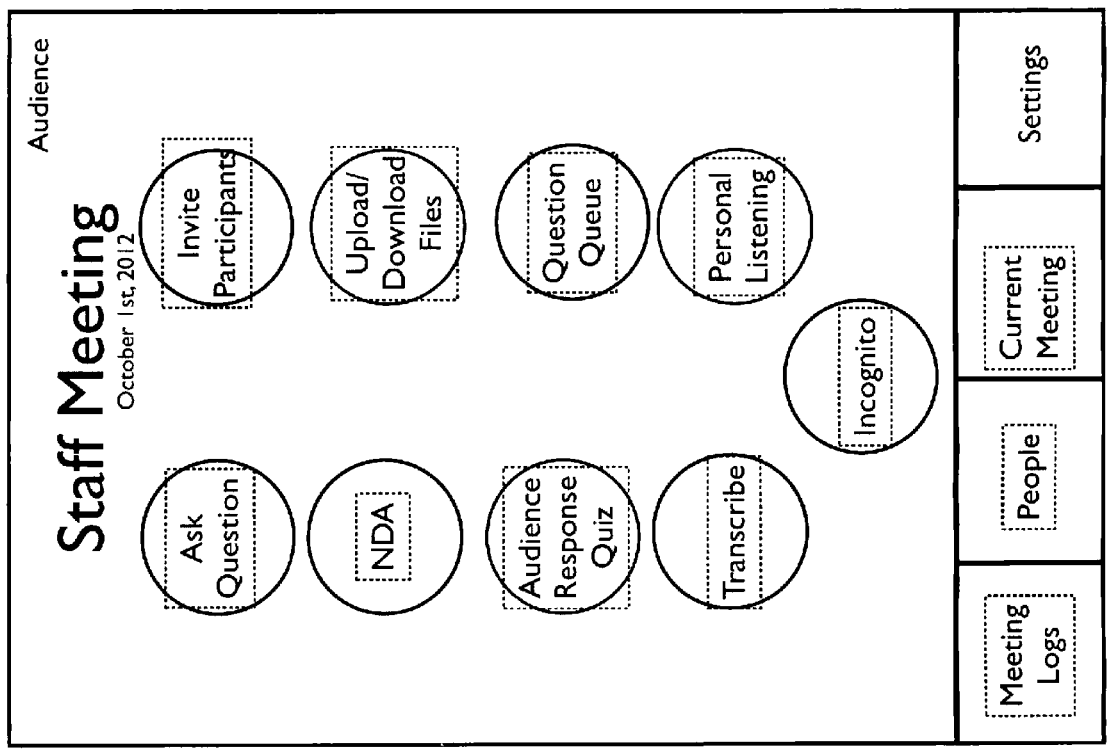
FIG. 19 shows a wireframe home screen for an attendee/participant at a particular session or meeting.

If one returns to the wireframe screen of FIG. 5 and assumes that the user of the app selects the Join Meeting icon, the user assumes the role of an attendee/participant who is to join a meeting or session. FIG. 23 shows a screen with a list of sessions for the attendee/participant to join. FIG. 19 shows the home screen of the attendee/participant who joins the "Staff Meeting" session of "Oct. 1, 2012."

This is the same wireframe screen as for a moderator/host (see FIG. 9), except that an Ask Question icon replaces the Start Meeting icon of the moderator/host.

Figure 21D:
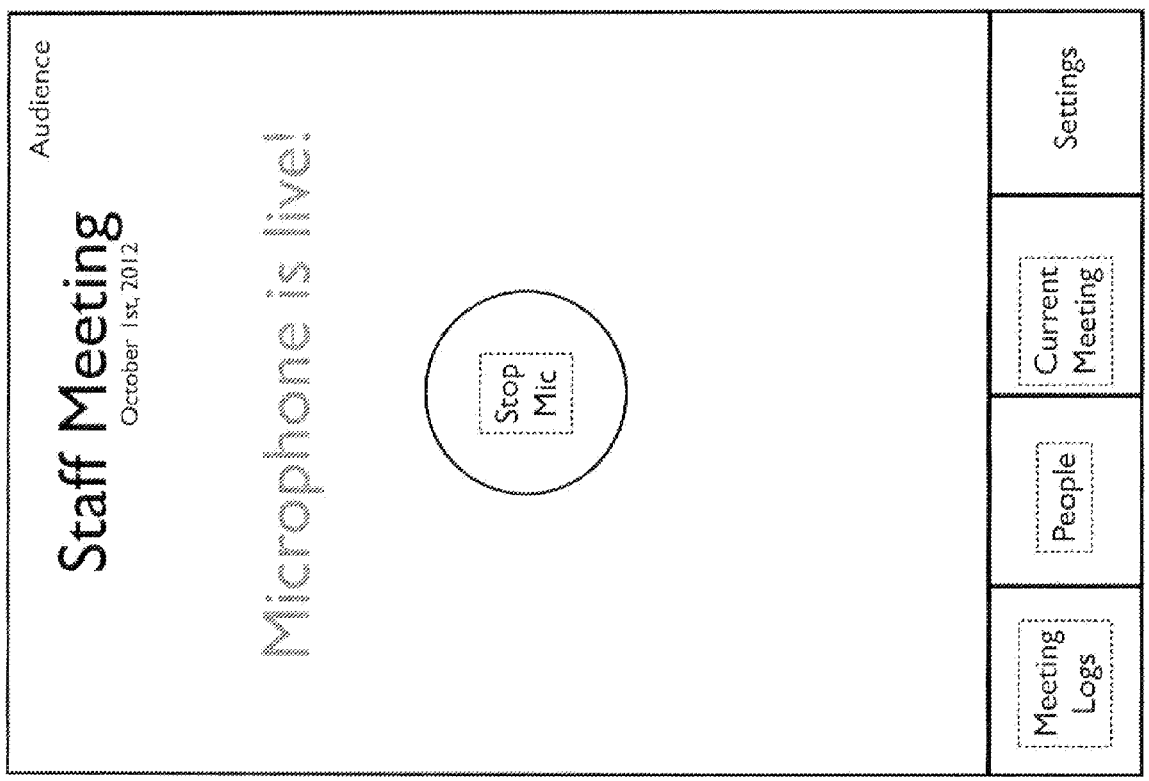
FIG. 21D shows that attendee/participant has received the floor and the personal mobile communications device is "live."

If attendee/participant user selects the Ask Question icon, the wireframe screen of FIG. 21A appears. As shown by the icons on that screen, the attendee/participant can ask a question live, or send a text question in. The FIG. 21B screen indicates the attendee/participant's location in the question queue. The screen shown in FIG. 21C allows the "Start Mic" icon to transform the attendee/participant's smartphone into a fully functional microphone and the screen of FIG. 21D appears. The Stop Mic icon turns off the microphone function. If the user has selected the Text Question icon, then the screen of FIG. 22 appears with a window into which the attendee/participant can type his question and then submit it to the meeting moderator/host. The FIG. 21C screen returns where the "Done" icon returns to attendee/participant to the meeting screen (FIG. 19). The user can record a question and send that audio file in to the moderator/host, instead of addressing the audience directly.

Figure 24A:
FIG. 24A shows a screen form for the submission of a response to an audience quiz from a meeting moderator/host.
Figure 24B:
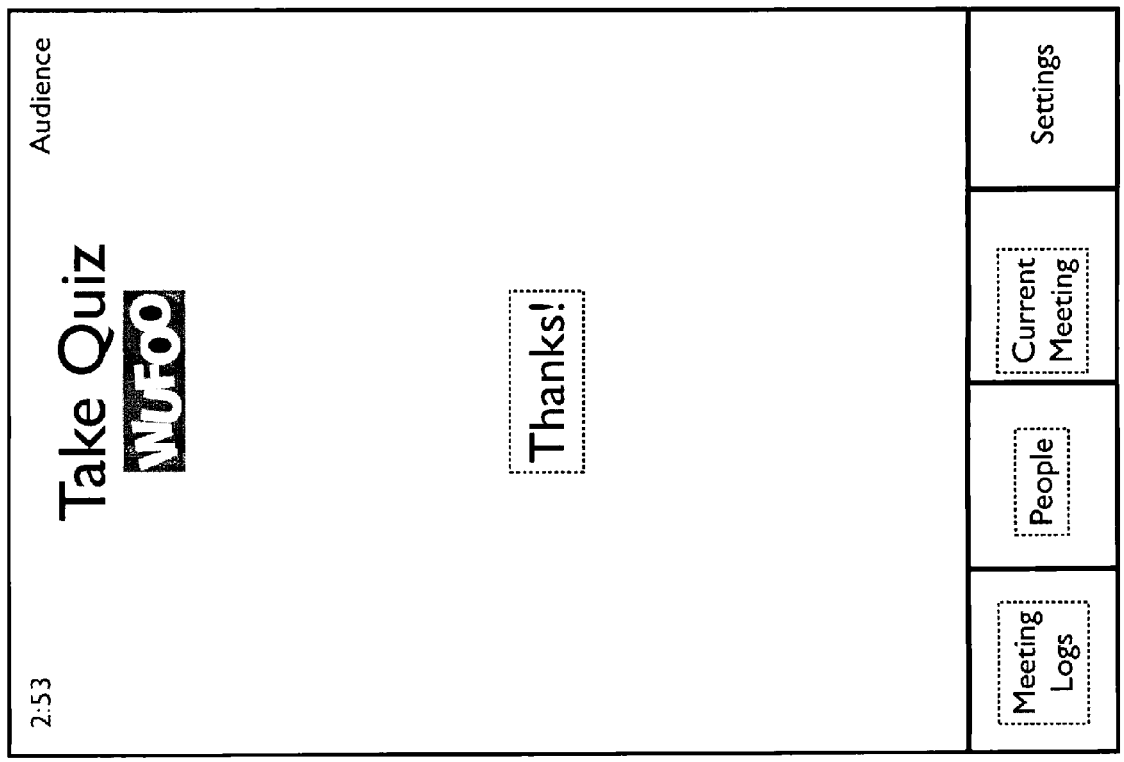
FIG. 24B shows a screen after the response and form has been submitted.

Many of the other icons of the attendee/participant user have the functions as previously described for moderator/host. For example, through Audience Response icon of the FIG. 19 screen the attendee/participant can engage with the audience response quiz or survey which the moderator/host of the meeting has distributed. FIG. 24A shows a quiz registration screen by which the user identifies himself and submits his response to the meeting quiz. The FIG. 24B screen acknowledges the submission of the quiz response to the user.

Through the NDA icon of the FIG. 19 screen, the attendee/participant can check the status of any non-disclosure agreement which might have been distributed for the current meeting. The screen of FIG. 25 indicates to the user that the he has accepted the NDA.

Figure 26:
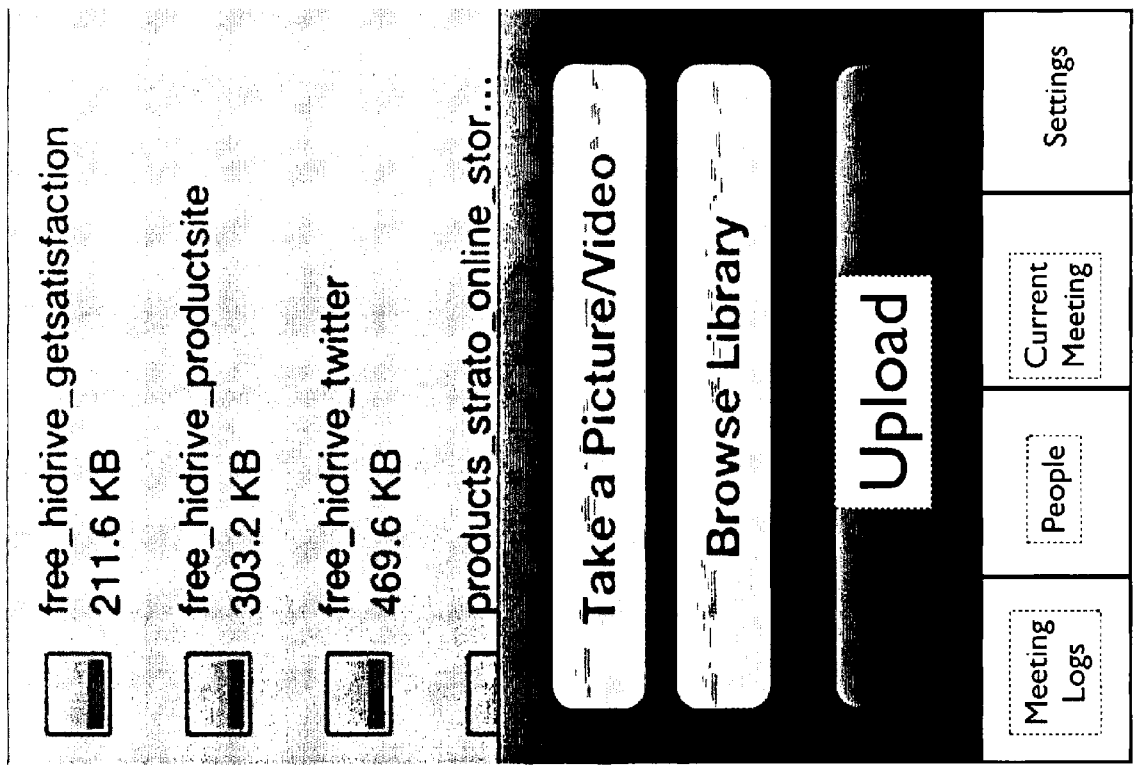
FIG. 26 shows an attendee/participant screen after the Upload/Download Files icon (FIG. 16) has been clicked.
Figure 29:
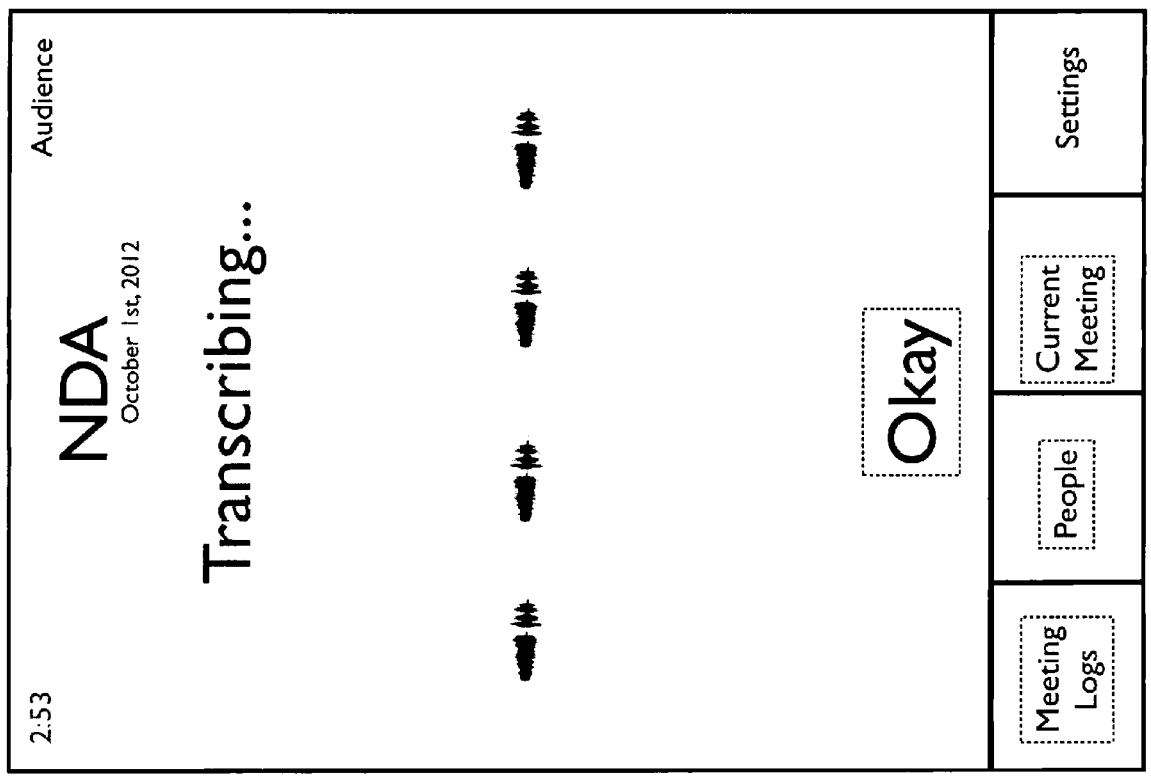
FIG. 29 shows an attendee/participant screen indicating that an audio file is being transcribed after the Transcribe icon (FIG. 16) has been clicked.
Figure 30:
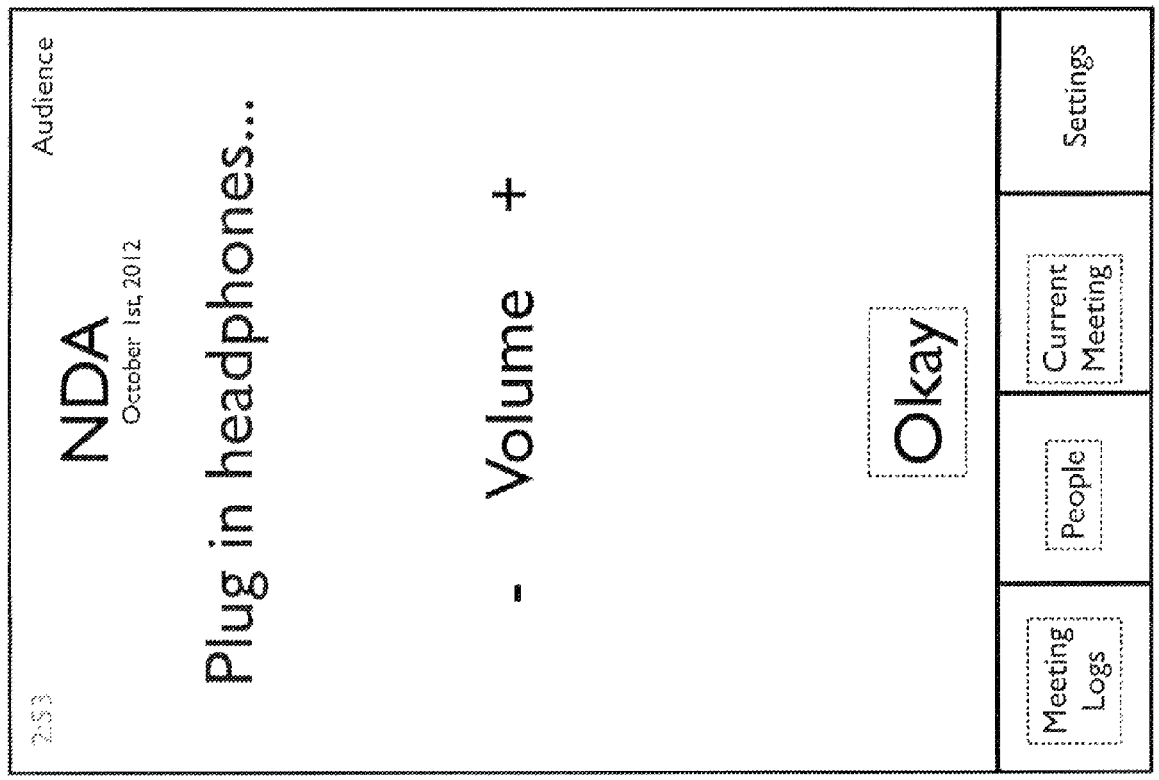
FIG. 30 shows a screen after the attendee/participant Personal Listening icon (FIG. 16) has been invoked to listen to an audio file or the current meeting.

FIG. 26 shows the Upload Files screen which appears when the attendee/participant user engages the Upload/Download Files icon of FIG. 19. FIG. 27 shows the wireframe screen for inviting participants upon engagement of that icon of the FIG. 19 screen. FIG. 29 shows the Transcribe function screen and FIG. 30 shows the Personal Listening function screen.

Figure 28A:
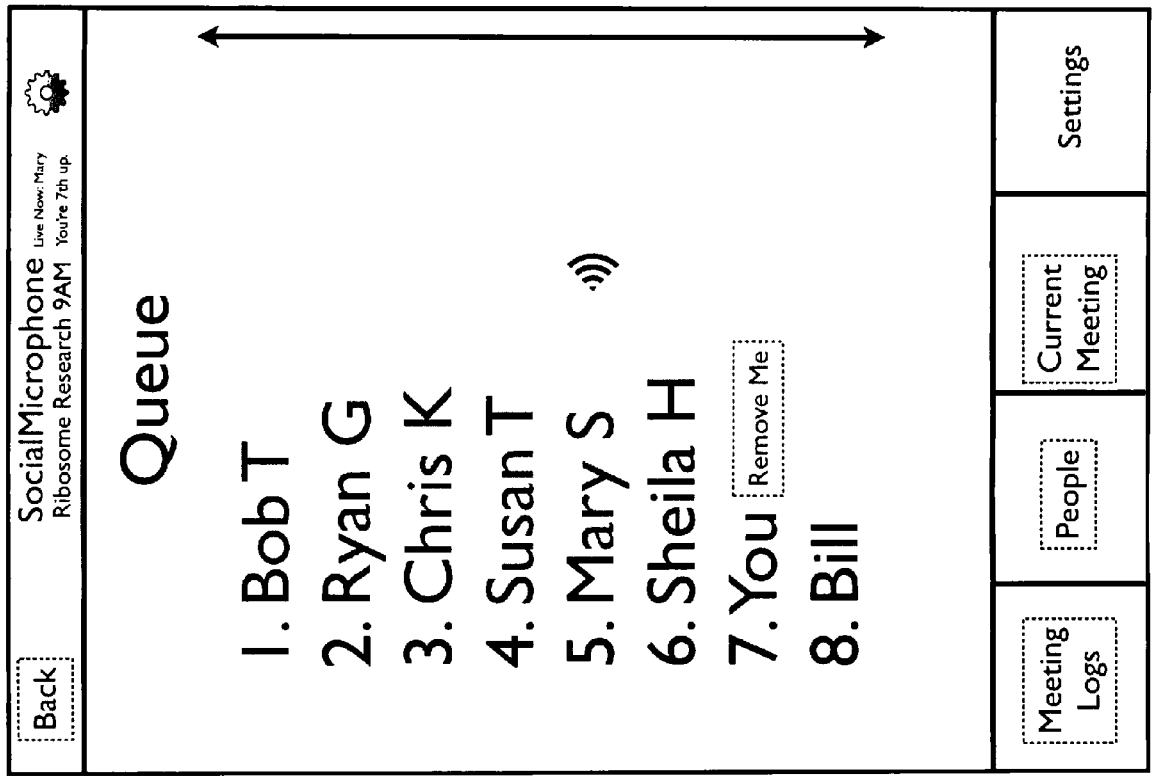
FIG. 28A shows an attendee/participant screen after the Question Queue icon (FIG. 16)
Figure 28B:
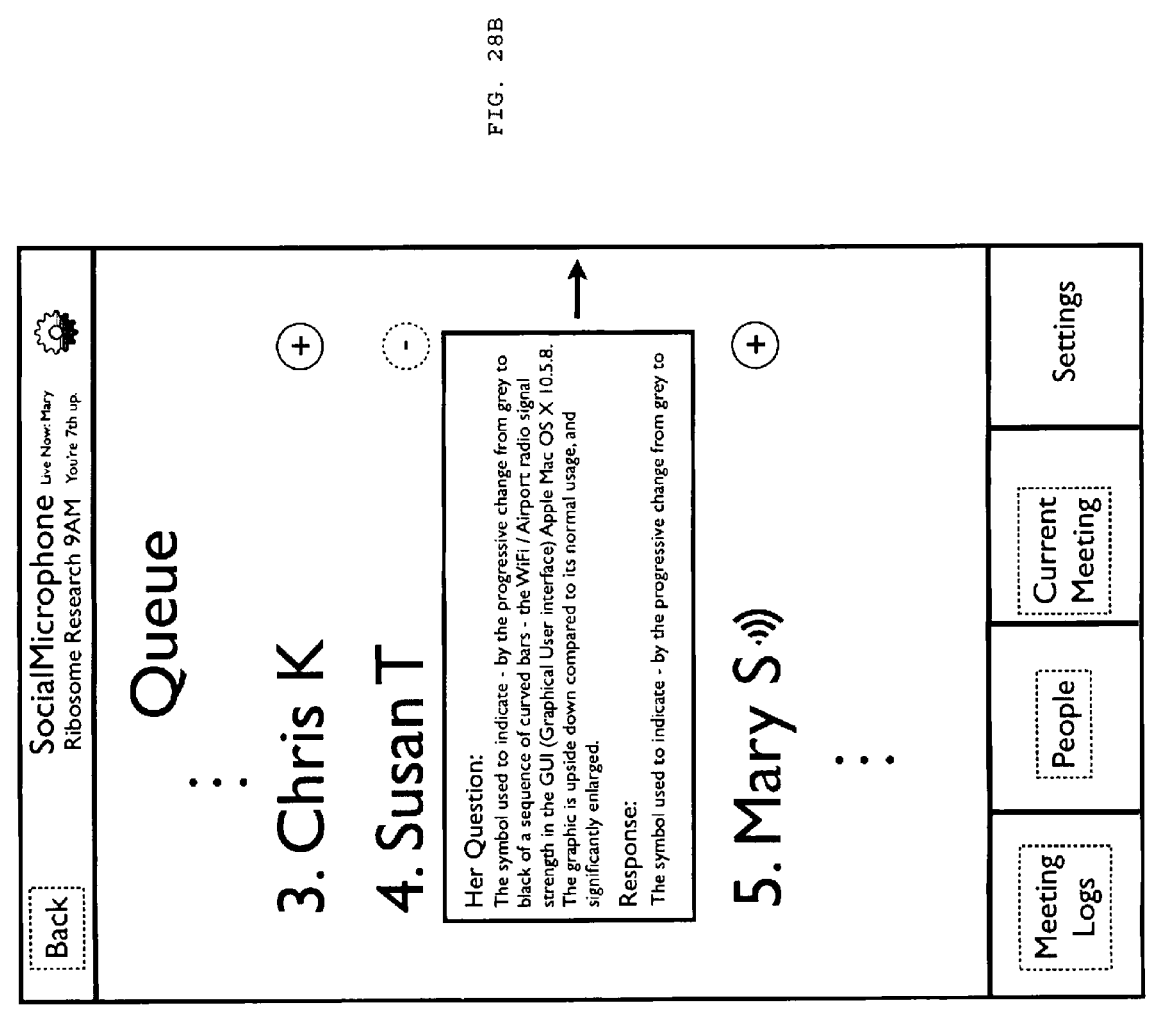
Figure 28C:
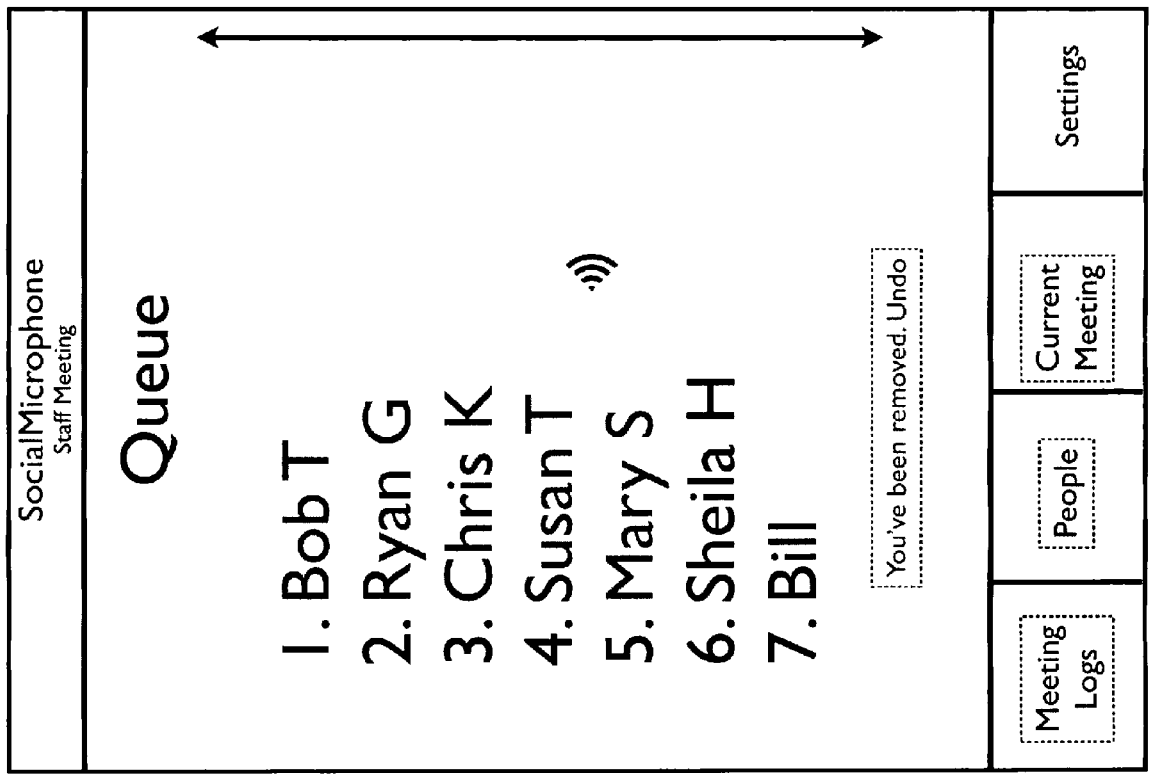
FIG. 28C shows the queue after the user has removed himself from the queue.

As for the moderator/host, the attendee/participant user upon engaging the Meeting Logs icon in the bottom bar sees a screen list of his previous meetings shown in FIG. 20A. Clicking on one of those meetings leads to the Meeting Log screen shown in FIG. 20B, which is again very similar to that of the moderator/host. Clicking on the Question Queue icon on the FIG. 19 screen allows the attendee/participant to see the queue of prospective speakers, his place in line if he has scheduled a question (FIG. 28A), and to remove himself from the queue if he so desires (FIG. 28C). Note that attendee/participant has access to information about the prospective speakers by clicking on their names or their question by clicking on the "+" symbols next to their names, in the same manner as a moderator/host. The question posed by prospective speaker Susan T is illustrated in FIG. 28B.

Hence the present invention integrates the functions of a microphone and meeting functions into an app for a programmable personal mobile communications device to enhance the experience of the device user.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications, and the titles were selected only to provide a guide to the reader and should not be considered as limiting the subject matter of the entitled text. This description will enable others skilled in the art to best utilize and practice the invention in various embodiments and with various modifications as are suited to a particular use. The scope of the invention is defined by the following claims.

The invention claimed is:

1. A method of operating a programmable personal mobile communications device at a meeting having a local wireless network connected to an amplified audio system, the method comprising the steps of:
   processing voice signals from a user of the personal mobile communications device at the meeting into local wireless network signals through an app on the programmable personal mobile communications device;
   transmitting the local wireless network signals through the app on the programmable personal mobile communications device, the local wireless network signals reprocessed into voice signals and broadcast over the amplified audio system to attendees/participants at the meeting;
   receiving a questionnaire over the local wireless network through the app, the questionnaire having questions related to the meeting;
   and transmitting a user response to the questionnaire back over the local wireless network through the app;
   whereby the steps are coordinated through the app on the programmable personal mobile communications device to enhance the experience of the user of the programmable personal mobile communications device at the meeting.

2. The method of claim 1 further comprising:
   receiving local wireless network signals corresponding to processed voice signals of at least one other user of a personal mobile communications device with the app at the meeting.

3. The method of claim 1 further comprising:
   receiving local wireless network signals corresponding to transcriptions of other meetings through the app.

4. The method of claim 1 further comprising:
   receiving local wireless network signals corresponding to a non-disclosure agreement for the meeting through the app.

5. The method of claim 4 further comprising:
   transmitting local wireless network signals corresponding to a user response to the non-disclosure agreement back through the app.

6. The method of claim 1 further comprising:
   receiving local wireless network signals corresponding to a welcome screen to the user, the welcome screen confirming the user's presence at the meeting through the app.

7. The method of claim 1 further comprising:
   transmitting and receiving Twitter messages related to the meeting through the app.

8. The method of claim 1 further comprising:
   receiving local wireless network signals having information identifying the meeting; and
   displaying the information on the programmable personal mobile communications device.

9. The method of claim 8 wherein the information identifying the meeting includes time, location and name of the meeting.

10. The method of claim 1 further comprising:
    displaying on the programmable personal mobile communications device one or more social media networking profiles of another attendee/participant at the meeting through the app.

11. The method of claim 1 wherein in the processing and transmitting steps the amplified audio system broadcasts voice signals from the user to the meeting immediately after the voice signals are reprocessed.

12. The method of claim 1 wherein in the processing and transmitting steps the amplifier audio system transmits voice signals from the user to the meeting, the voice signals having been recorded.

13. A programmable personal mobile communications device having at least one processor and a memory, the memory holding instructions of an app for the at least one processor to enhance the experience of a user of the programmable personal mobile communications device at a meeting having a local wireless network connected to an amplified audio system, by performing the following steps of:
    processing voice signals from a user of the personal mobile communications device at the meeting into local wireless network signals through an app on the programmable personal mobile communications device;
    transmitting the local wireless network signals through the app on the programmable personal mobile communications device, the local wireless network signals reprocessed into voice signals and broadcast over the amplified audio system to attendees/participants at the meeting;
    receiving a questionnaire over the local wireless network through the app, the questionnaire having questions related to the meeting;
    and transmitting a user response to the questionnaire back over the local wireless network through the app;
    whereby the steps are coordinated through the app on the programmable personal mobile communications device.

14. The programmable personal mobile communications device of claim 13 wherein the processor is further instructed to perform the step of:
    receiving local wireless network signals corresponding to processed voice signals of at least one other user of a personal mobile communications device with the app at the meeting.

15. The programmable personal mobile communications device of claim 13 wherein the processor is further instructed to perform the step of:
    receiving local wireless network signals corresponding to transcriptions of other meetings through the app.

16. The programmable personal mobile communications device of claim 13 wherein the processor is further instructed to perform the step of:
    receiving local wireless network signals corresponding to a non-disclosure agreement for the meeting through the app.

17. The programmable personal mobile communications device of claim 16 wherein the processor is further instructed to perform the step of:
    transmitting local wireless network signals corresponding to a user response to the non-disclosure agreement back through the app.

18. The programmable personal mobile communications device of claim 13 wherein the processor is further instructed to perform the step of:

receiving local wireless network signals corresponding to a welcome screen to the user, the welcome screen confirming the user's presence at the meeting through the app.

19. The programmable personal mobile communications device of claim 13 wherein the processor is further instructed to perform the step of:

transmitting and receiving Twitter messages related to the meeting through the app.

20. The programmable personal mobile communications device of claim 13 wherein the processor is further instructed to perform the steps of:

receiving local wireless network signals having information identifying the meeting; and displaying the information on the programmable personal mobile communications device.

21. The programmable personal mobile communications device of claim 20 wherein the information identifying the meeting includes time, location and name of the meeting.

22. The programmable personal mobile communications device of claim 13 wherein the processor is further instructed to perform the step of:

displaying on the programmable personal mobile communications device one or more social media networking profiles of another attendee/participant at the meeting through the app.

23. The programmable personal mobile communications device of claim 13 wherein in the processing and transmitting steps the amplified audio system broadcasts voice signals from the user to the meeting immediately after the voice signals are reprocessed.

24. The programmable personal mobile communications device of claim 13 wherein in the processing and transmitting steps the amplifier audio system transmits voice signals from the user to the meeting, the voice signals having been recorded.

* * * * *